United States Patent
Aisa

(10) Patent No.: US 7,034,707 B2
(45) Date of Patent: Apr. 25, 2006

(54) SYSTEM AND DEVICE FOR MONITORING AT LEAST ONE HOUSEHOLD ELECTRIC USER, IN PARTICULAR A HOUSEHOLD APPLIANCE

(75) Inventor: Valerio Aisa, Fabriano (IT)

(73) Assignee: WRAP, S.p.A., Fabriano (IT)

( * ) Notice: Subject to any disclaimer, the term of this patent is extended or adjusted under 35 U.S.C. 154(b) by 0 days.

(21) Appl. No.: 10/363,747

(22) PCT Filed: Apr. 3, 2001

(86) PCT No.: PCT/IB01/00560

§ 371 (c)(1),
(2), (4) Date: Oct. 14, 2003

(87) PCT Pub. No.: WO02/21660

PCT Pub. Date: Mar. 14, 2002

(65) Prior Publication Data

US 2005/0099314 A1    May 12, 2005

(30) Foreign Application Priority Data

Sep. 5, 2000    (IT)    ............................ TO2000A0841

(51) Int. Cl.
*G08B 21/00*    (2006.01)

(52) U.S. Cl. ..................... 340/662; 340/663; 340/664; 340/679; 340/310.01

(58) Field of Classification Search ........... 340/825.63, 340/825.72, 825.75, 662, 663, 664, 310 R, 340/679, 683, 531, 540, 539.1, 310.01, 310.02; 307/39, 35, 33, 11; 700/109, 110, 121, 184
See application file for complete search history.

(56) References Cited

U.S. PATENT DOCUMENTS

| 4,315,248 | A |   | 2/1982 | Ward |
|---|---|---|---|---|
| 4,360,881 | A |   | 11/1982 | Martinson |
| 4,990,908 | A |   | 2/1991 | Tung |
| 5,017,799 | A | * | 5/1991 | Fishman ...................... 307/34 |
| 5,021,779 | A | * | 6/1991 | Bisak .................... 340/825.69 |
| 5,179,376 | A | * | 1/1993 | Pomatto ................ 340/870.02 |
| 5,207,071 | A |   | 5/1993 | Ozu et al. |

(Continued)

FOREIGN PATENT DOCUMENTS

EP    0535631 A1    4/1993

(Continued)

*Primary Examiner*—Hung Nguyen
(74) *Attorney, Agent, or Firm*—Cesari and McKenna, LLP

(57) ABSTRACT

A system that monitors at least a household electric user (HA1–HA4), in particular a household appliance, includes a monitoring device (MSA) that is connected between a source of electric energy (OUT) and the electric user, the monitoring device (MSA) including a metering means for detecting one or more electric quantities being associated with the operation of said user (HA1–HA4), and further including a control means that is programmed for (i) comparing the electric quantity or quantities being measured through the metering means with reference values of said electric quantity or quantities which are stored within the control means; (ii) generating, in function of the comparison, information being representative of the current operating status or phase of operation of the electric user (HA1–HA4); and (iii) allowing for the reading or transmission of the information to the outside of said device (MSA). The monitoring device also including a communication means, for realizing a transmission and/or reception of data or information on the electric supply line which connects the user (HA1–HA4) to the device (MSA), by means of a modulation of electric power between the user (HA1–HA4) and the device (MSA) and/or vice-versa.

14 Claims, 12 Drawing Sheets

U.S. PATENT DOCUMENTS

| | | | |
|---|---|---|---|
| 5,481,140 A * | 1/1996 | Maruyama et al. | 307/11 |
| 5,867,809 A * | 2/1999 | Soga et al. | 702/130 |
| 6,142,666 A * | 11/2000 | Koether et al. | 374/149 |
| 6,385,497 B1 * | 5/2002 | Ogushi et al. | 700/110 |

FOREIGN PATENT DOCUMENTS

| | | |
|---|---|---|
| EP | 0561255 A1 | 9/1993 |
| EP | 0817541 A2 | 7/1997 |

* cited by examiner

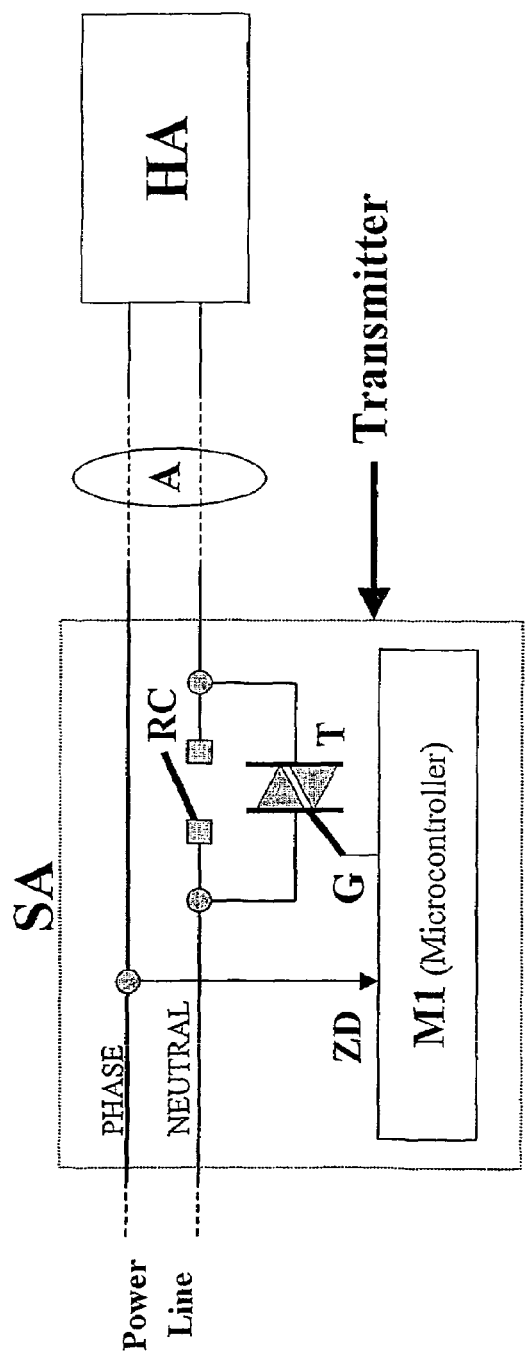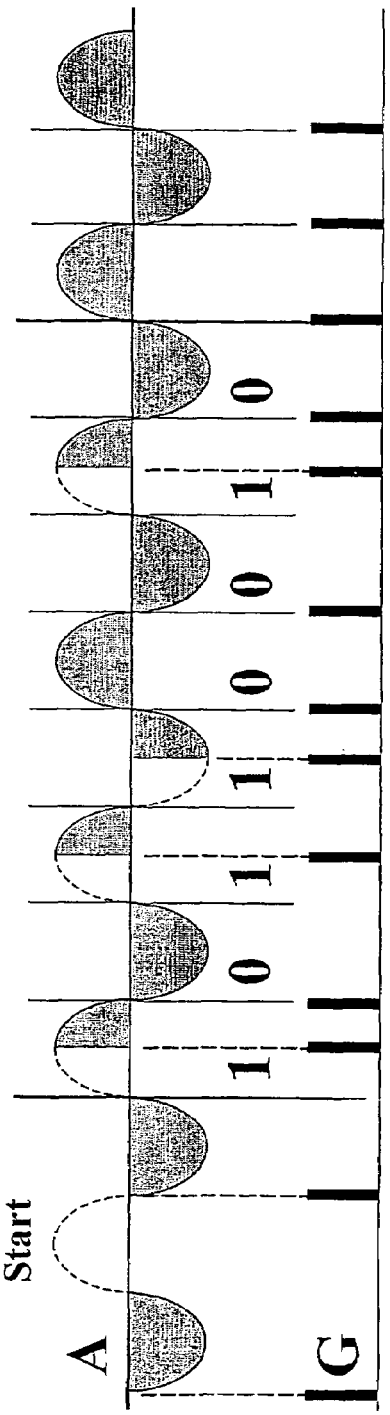
FIG. 4

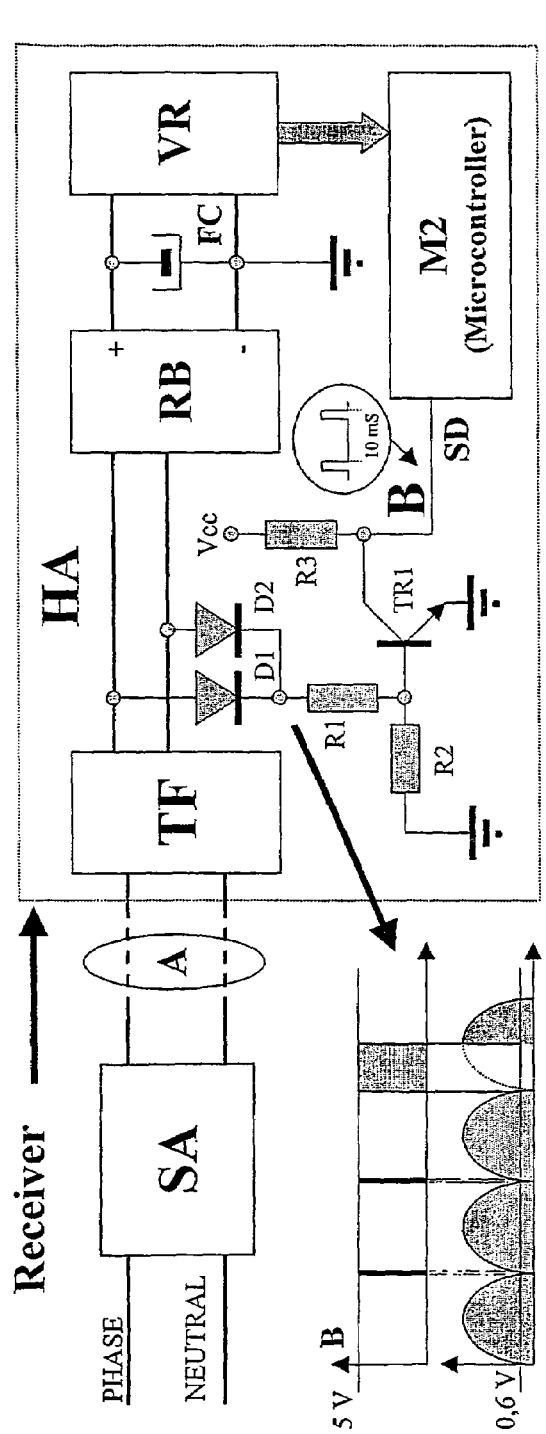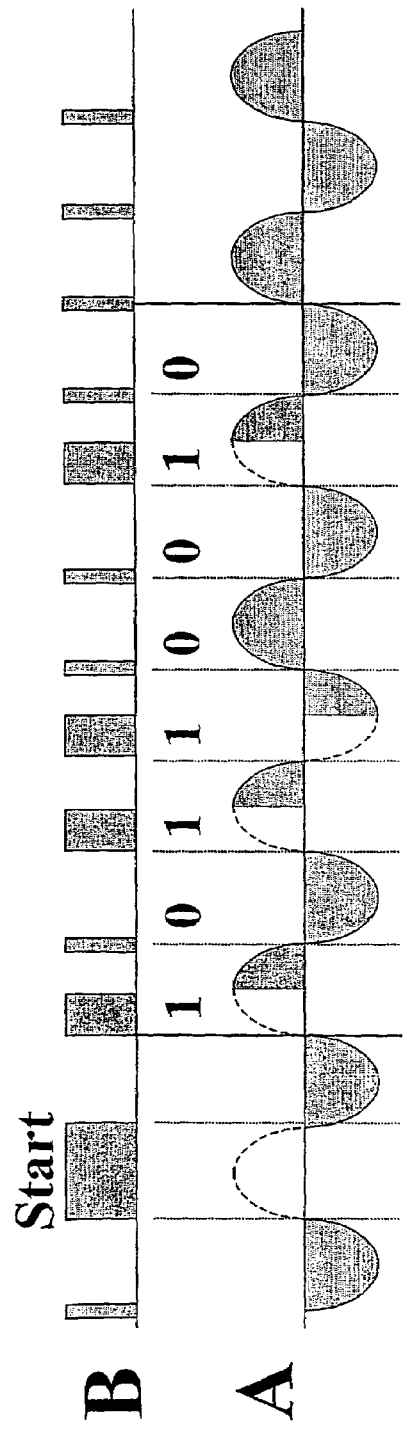
FIG. 5a

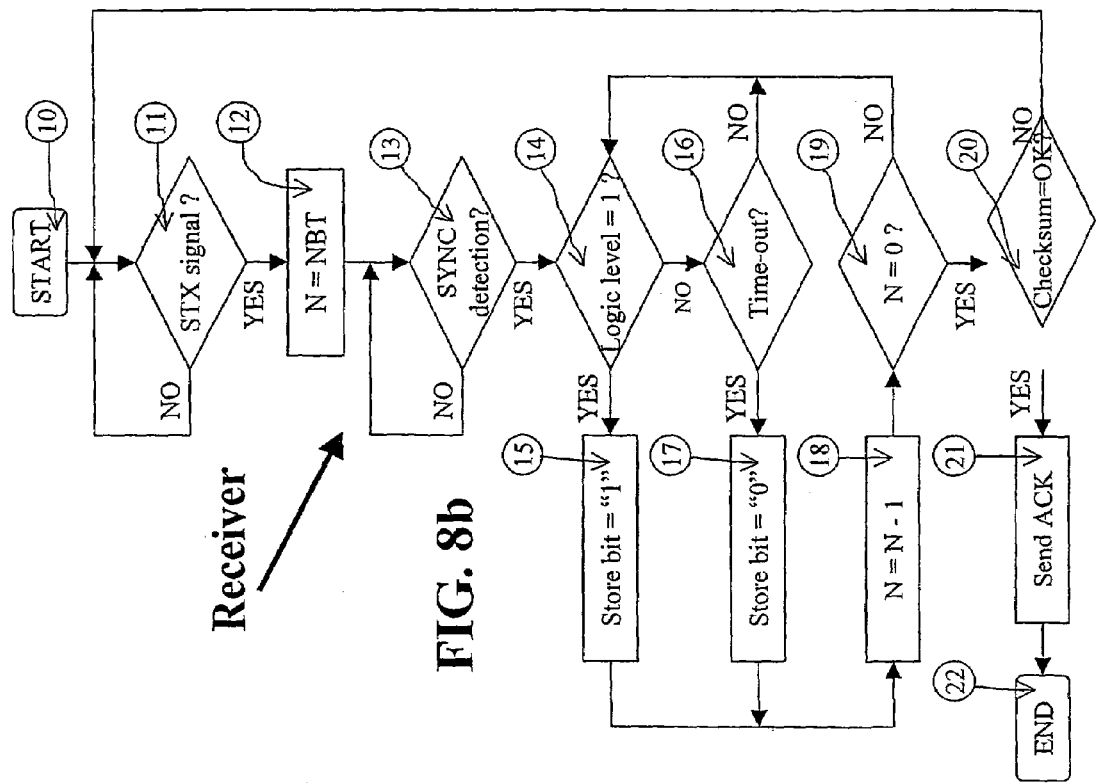
FIG. 8b Receiver
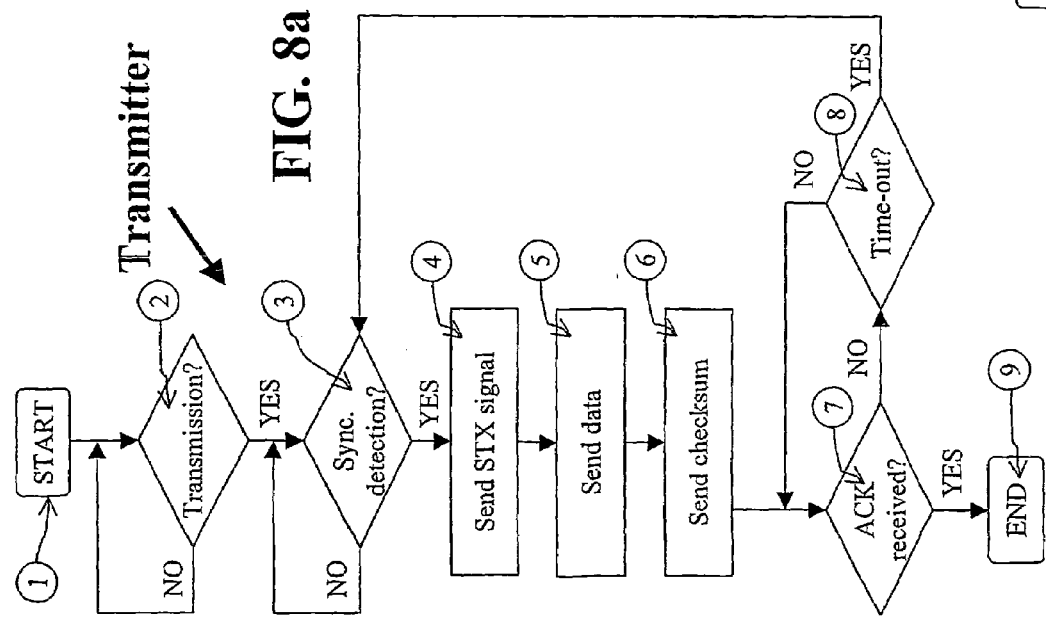
FIG. 8a Transmitter

SYSTEM AND DEVICE FOR MONITORING AT LEAST ONE HOUSEHOLD ELECTRIC USER, IN PARTICULAR A HOUSEHOLD APPLIANCE

DESCRIPTION

The present invention relates to system and a device for monitoring a household electric user, in particular a household appliance.

It is known that household electric users can be classified in two basic groups, i.e. users having sophisticated control systems, capable to dialog with peripheral and external equipments, and more conventional users developed according to the "stand-alone" philosophy.

A common requisite for both groups of users is to be "user friendly", i.e. allowing their use in a simple and efficient manner, either when installed alone or inserted in a more complex context (such as a home automation system) and allowing both their maintenance and technical servicing in the most efficient way as possible.

It is known, for instance, that the components of certain household electric users, such as household appliances, are subject to wear and occasional faults and how repair operations in consequence of such faults are required in the daily practice.

Some household appliances may be equipped with a sophisticated electronic control system, provided with specific sensor means, through which the nature of a malfunction can be identified substantially in real time and appropriately signalled, for making easier its subsequent repair.

On the contrary, in most of the conventional household appliances, the identification of the fault nature of a component by the technical servicing personnel is not immediate; in fact, said personnel is often forced to check several components of the household appliance and/or simulate the performance of a standard work program, in order to identify exactly the instant when such a malfunction occurs, and from this result attempt to go back to the actual origin of the problem.

This may entail several difficulties and a considerable waste of time, which reflect negatively on the costs of repairing.

On the other hand, it is also known that the "preventive" maintenance or servicing activity, being intended as the activity associated to the direct or indirect control of the wear status of some components of a household appliance, is practically non-existent so far. Such an activity, in fact, is nearly exclusively restricted to the advice for the user to let the function or wear status of certain components be checked after a certain period of time elapsed from the installation date of the household appliance, or from a previous maintenance operation. However, such an approach does not ensure an actual control of the wear status of the components of the household appliance, on account of their real exploitation, nor a prompt detection of initial signs of irregularities in the appliance operation before the latter may turn into a problem for the person using the appliance (hereinafter referred to as "consumer").

Let us think, for instance, of a household appliance (and in particular, to one of its specific operation programs) being used more frequently with respect to usual standards of use, or vice-versa of a household appliance used only rarely with respect to the standard practice (and without a specific intensive use of a specific program).

It is clear that, in the first case, a certain component of the household appliance will wear out much earlier than the "estimated" date for its replacement, whereas, in the second case, the component may be replaced earlier than necessary during a planned maintenance operation, even if not actually worn.

The present invention is based on the acknowledgement of the fact that it would be highly advantageous for the serviceman called for repair or maintenance operations to avail himself of information relating to the operating status and the "historical" events of a household electric user, above all if the latter is not equipped with a proper sophisticated "self-diagnostic" system for the identification of faults or malfunctions.

Accordingly, the idea at the basis of the present invention is to provide a monitoring device which can be associated in a simple and fast manner to one or more household electric users and which is capable of generating, and eventually receiving, at least information of the diagnostic and statistical type, i.e. information representative, on one hand, of likely malfunctions the electric user is subject to (including those faults not directly detectable by the user) and, on the other hand, of the type of activity performed in the past by the electric user itself.

In this way, through the association of the above monitoring device to a household electric user, the possibility is offered to efficiently identify and/or signal the nature of a malfunction as soon as it occurs, and to detect any initial signs of operation irregularities of the electric user itself, before this may become a problem for the consumer. Singularly, through such a monitoring device it is possible to detect both the conditions and modes of use of the electric user in the time, for allowing a sufficiently exact estimation of the wear status of its internal components.

Other problems concerning the most conventional electric users is that they cannot constitute an active part of a "distributed management" system of the domestic absorption of electric power, i.e. a system realizing the control on the total absorption of power of its elements (electric user) without requiring a central controller, but rather using the capability of each of them to self-adjusting their consumption in accordance with the respective priority level. A system of this type is described for example in EP-A-0 727 668.

Such a mode of management presumes, for its correct operation:
the presence, upstream, of a meter of the total electric power or current absorbed by the household environment, which is capable of spontaneously communicating the measured value to all the electric users connected to a suitable household bus;
the presence of electronically controlled electric users, which are programmed for self-adjusting their own electric power absorption on the basis of the actual available power and in relation to their relevant priorities.

The managing procedure known from EP-A-0 727 668 has the advantage, with respect to the centralized procedure, of being more powerful and efficient, without requiring any intervention from the consumer.

The increased powerful lies in that the exploitation of the communication network is reduced (typically less that 5%) and independent from the number of the components of the system, since the network must carry at regular intervals only the information pertaining to the total power being absorbed by the whole set of electric users, onto which each of the same users self-adjusts its absorption; on the contrary, in the systems being based on a central load manager (master), the latter, in order to suitably share the available power among the electric users (slave) requesting power, must continuously interrogate the users by means of an interrogation system of the "polling" type; the polling system is, by its nature, tends to keeps Woe band of the communication network highly busy, said engagement increasing in a manner being more than proportional with the increase of the number of the electric users, The higher efficiency is instead associated to the better exploitation of tile electric users, deriving from the fact that their self-adjusting capability (obtained through an appropriate "self-dosing" of the power absorption, being consistent with the actual availability of power of the whole household environment at the moment) allows the simultaneous activation of several appliances without the risk of exceeding the maximum absorption of electric power (contractual power value).

However, the solution described in EP-A-0 727 668 has the drawback of requiring electric users having a sophisticated control system, so that the traditional users, or anyway not programmed for self-adjusting their own power absorption, are unable to contribute in an active and efficient way to the system of distributed management of the household absorption of electric power.

From EP-A-0 561 255 a power distribution control system is known, which can distribute the electric energy to houses, factories and other customers while considering the demand variable from one minute to the next and various customer situations. The demand control apparatus is adapted to compute the quality of working current in each of the loads from a difference between the total quantities of working current before and after shut-off in that load and to re-start the load within a range defined by a difference between a set quantity of current and the total quantity of working current after shut-off in the load in accordance with its priority level.

From U.S. Pat. No. 4,990,908 a remote load control system is known, which selectively applies power to a ceiling fan and a light from a wall control unit installed in an existing on/off wall switch location. A counter in a control logic circuit is clocked by the AC power input waveform and generates unique control logic signals corresponding to the status of mode select switches.

From U.S. Pat. No. 5,207,071 a current control apparatus is known, comprising first controllers adapted for detecting an overall or total load current to calculate distribution values for distributing a current margin with respect to an overall or total current limit value to respective air-conditioners; and second controllers adapted for respectively controlling air-conditioners so as not to exceed individual current limit values, and for carrying out an incremental correction of individual current limit values in accordance with distribution values calculated by the first controllers.

Within this frame, the present invention has also aim of indicating a monitoring device which can be associated in a simple and fast manner to a generic household electric user, and which is capable of generating at least information of the functional type i.e. indicating the current operating mode of the electric user itself, to be used for realizing a more efficient management of the electric power absorption.

In the way, through the association of the above monitoring device to a generic household electric user; it is possible to extend also to conventional electric users (or not programmed to that purpose) the advantages being proper of the network connection of the products equipped with sophisticated electronic control systems; all the above for allowing to keep the electric power absorption below a maximum limit in a efficient and clear way for the consumer.

SUMMARY OF THE INVENTION

On the basis of the above considerations, the main aim of the present invention is therefore that of providing a monitoring device capable of generating, and eventually receiving and/or storing in a non-volatile but updatable memory, information of the diagnostic and the statistical type relating to one or more household electric users, in order to let said information available for any person called for repair or maintenance operations to the electric user itself.

Another aim of the invention is to provide a monitoring device which allows the likely reception and transmission of information towards the external environment.

A further aim of the invention is to provide a monitoring device which, whenever required, is capable of generating information relating to the current operating status of the electric user or users associated to it, which information are useful for example for an efficient management of a system for rationalizing the energy consumption in a household environment.

A further aim of the invention is to provide a monitoring device which, whenever required, allows for realizing a remote control of the operation of a household electric user, also from a location outside the household environment wherein the electric user is installed. A further aim of the invention is to provide a monitoring device which can be adapted to various types of household electric users.

These on other aims, which will become apparent later, are achieved according to the present invention by a system and a device for monitoring a household electric user, in particular a household appliance, incorporating the features of the annexed claims, which form an integral part of the present description.

BRIEF DESCRIPTION OF THE DRAWINGS

Aims, features and advantages of the present invention will become apparent from the following detailed description and the annexed drawings, which are supplied by way of non limiting example, wherein:

FIG. 4 shows an example of a transmission stage of binary information, or transmitter, being comprised in the control system of the monitoring device of FIG. 1;

FIG. 5*a* shows an example of a reception stage of binary information, or receiver, being comprised in the control system of one or more of the the electric users HA of FIG. 1;

FIG. 8*a* shows a flowchart describing a generic transmission of digital information according to the invention;

FIG. 8*b* shows a flowchart associated to the receiving stage of digital information according to the invention;

DETAILED DESCRIPTION OF AN ILLUSTRATIVE EMBODIMENT

1. The Monitoring Device According to the Invention

Figure 1:
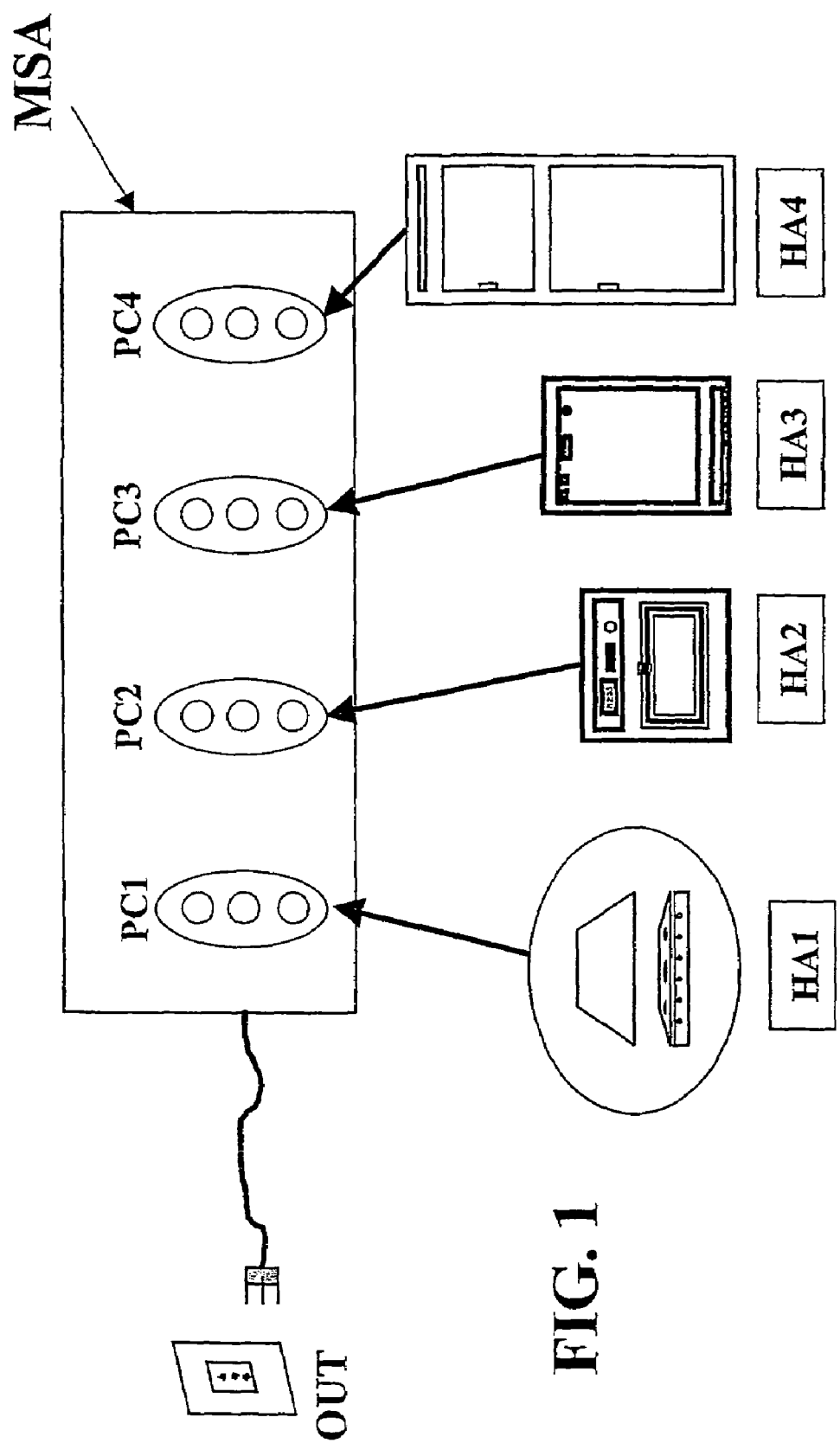
FIG. 1 shows the mode of connection between a monitoring device according to the invention and a plurality of electric user.

FIG. 1 illustrates the way of connection between a monitoring device according to the present invention, indicated with MSA (Multiple Smart Adapter) and a plurality of household electric users; in the non limiting example, the electric users are four, indicated by HA1–HA4 and represented by a hob with hood, an electric oven, a dishwasher and a refrigerator, respectively. As it can be imagined, this configuration is particularly advantageous in the field of built-in household appliances, i.e. for kitchen applications where the household appliances are integrated inside the furniture.

The device MSA is interposed between a current outlet indicated with "OUT" in FIG. 1 and the electric users HA1–HA4; for this connection, the device MSA is equipped with a plurality of current outlets, indicated with PC1–PC4, within which the plugs of the supply cables of the same users HA1–HA4. Therefore, as it can be seen the physical connection between the monitoring device MSA to the relevant electric users HA1–HA4 can be done in a very simple way, along the electric supply line of the users.

The device MSA is provided for performing a monitoring and control function with respect the electric users; according to the application of the invention herein described, the basic functions of the monitoring device MSA comprises one or more of the following:

According to the application of the invention described herein, the basic functions performed by the monitoring device SA are one or more of the following ones:

a) metering of the electric current absorbed instant by instant by each of the electric users HA–HA4;

b) metering of the mains voltage applied to each of the electric users HA–HA4;

c) metering of the power factor (cost) of the electric load represented by each of the electric users HA–HA4;

d) metering of the power absorbed instant by instant by each of the electric users HA–HA4;

e) metering, and storing in a suitable non volatile memory, of the electric energy consumed by each of the electric users HA–HA4;

f) metering, and storing in a suitable non volatile memory, of the overvoltages and brownouts of the mains voltage during a certain time interval;

g) remote control of each of the electric users HA–HA4 by means of a relay;

h) generation, and storing in a suitable non volatile memory, of information relating to the operating status of each of the electric users HA–HA4;

i) generation, and storing in a suitable non volatile memory, of statistical data related to the operation of each of the electric users HA–HA4 and mode of use by the person operating the electric users;

j) generation, and storing in a suitable non volatile memory, of diagnostic information related to the operation of each of the electric users HA–HA4, which are based on the trends of the electric quantities metered by MSA;

k) dialog capacity with the external environment, through appropriate communication technologies (power line, radio-frequency, two-wires cable, and so on).

Figure 2:
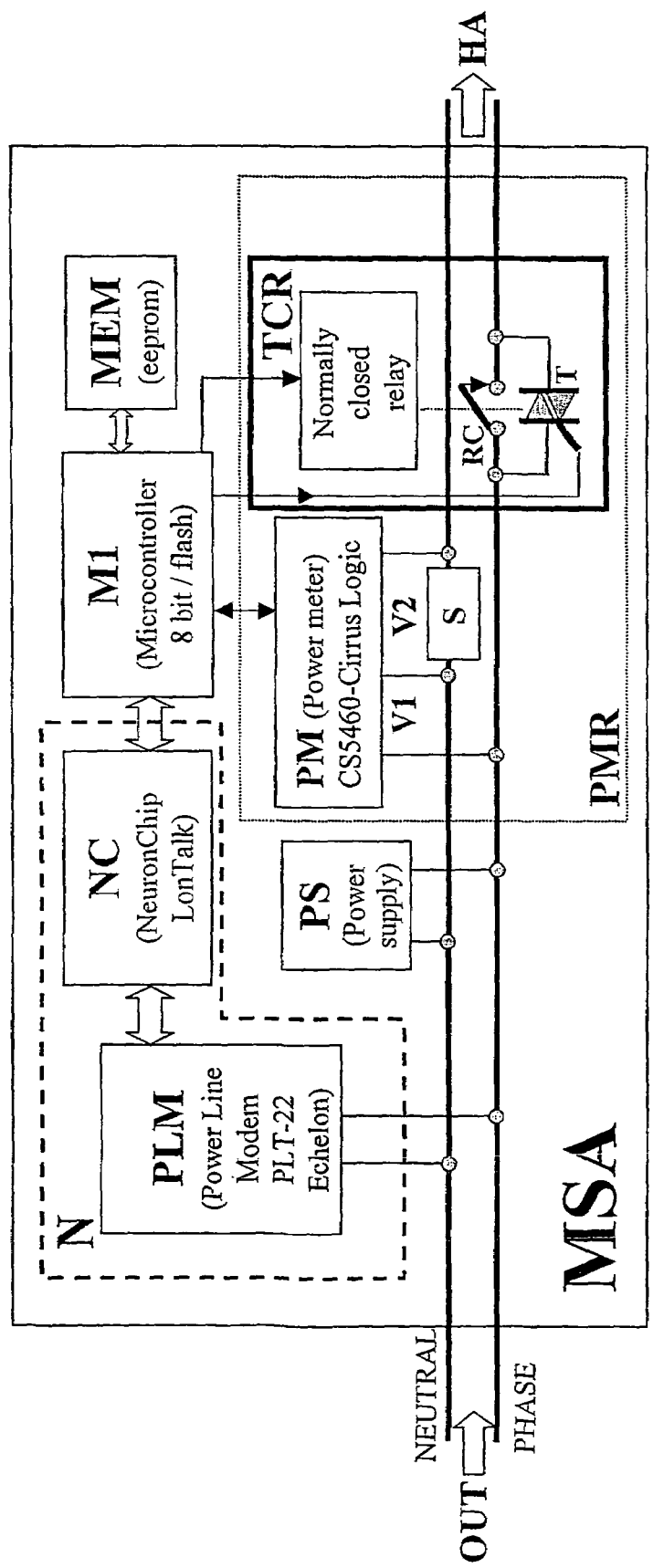
FIG. 2 shows a block diagram of a possible physical embodiment of the monitoring device of FIG. 1.

A possible physical implementation of the device MSA is represented in FIG. 2 illustrating the block diagram of the device itself and its mode of interconnection with only one of the electric users HA; it should be noticed that, in FIG. 2, for simplicity's sake, a single functional block indicated with PMR is represented, being described in the following; however, it has to be considered that, as shown in the subsequent FIG. 3, the block PMR being provided by device MSA are preferably in the same number of the electric outlets, which in the non limiting example of FIG. 1 are four (PC1–PC4).

The block PLM (Power Line Modem) represented in FIG. 2 is realized, by way of non limiting example, using the transceiver PLT-22 by Echelon (USA), whose purpose is to warrant the bi-directional power line communication towards the external environment through the LonTalk® protocol (ANSI EIA–709). This protocol is implemented within the block indicated with NC realized by a Neuron-Chip® device, currently manufactured by Toshiba and Cypress (LonTalk® and NeuronChip® are registered trademarks of the US company Echelon Inc.).

The set of blocks PLM and NC therefore forms a so-called communication node, represented by the hatched block N in FIG. 2.

The block M1 (Microcontroller) is represented by way of non limiting example by any 8-bit microcontroller (preferably, but not necessarily having a flash memory), whose purpose is to manage the device SA.

The block PS (Power Supply) is the block ensuring the stabilized supply to all the active elements of the device MSA, in accordance with their electric specifications.

The block MEM is a memory block consisting, by way of non limiting example, of a non volatile memory of the eeprom type, appropriately connected to the microcontroller M1, wherein the latter stores all information obtained from the study of the trends of one or more electric quantities associated to the operation of the electric user HA, as detected by the metering block PM (Power Meter).

The block PM performs the important task of metering one or more of the various electric quantities associated to the operation of each of the electric users being associated to the device MSA and communicate the metered value to the microcontroller M1, to which it is appropriately connected.

The block PM is realized, by way of non limiting example, by means of a device CS5460 by Cirrus Logic (USA), capable of metering current, voltage, power factor ($\cos\phi$), power and energy.

According to a much simpler and cost-effective version, the block PM may simply consist of a current sensor, such as a resistive shunt or toroid, whose generated voltage, being proportional to the current absorbed by the relevant electric user, is read by the microcontroller M1 (directly or after appropriate amplification) through an appropriate analog-digital conversion channel fitted on it.

It is clear that any other device PM having an intermediate complexity compared to the two limit cases described above, is fully included in the aims of the present invention.

In the instance of the device PM described in FIG. 2, the measure of the primary electric quantities, represented as known by the current absorbed by the loads HA1–HA4 and the voltage applied to their terminals, is done respectively through the metering of the voltage V2 detected at the terminals of an appropriate current sensor (resistive shunt or or toroid or other current detector), indicated by the block S (Shunt), and of voltage V1, as detected through an appropriate resistive divider, not shown since it is contained in the same block PM.

The derived electric quantities, such as cost, power and energy, are then obtained through appropriate mathematic elaborations performed by the same device CS5460 of block PM, and made available to the microcontroller M1 for likely further elaborations.

In FIG. 2, TCR indicates a block representing the triac T and the contact RC of a normally closed relay, whose functions will be described in the following.

Figure 3:
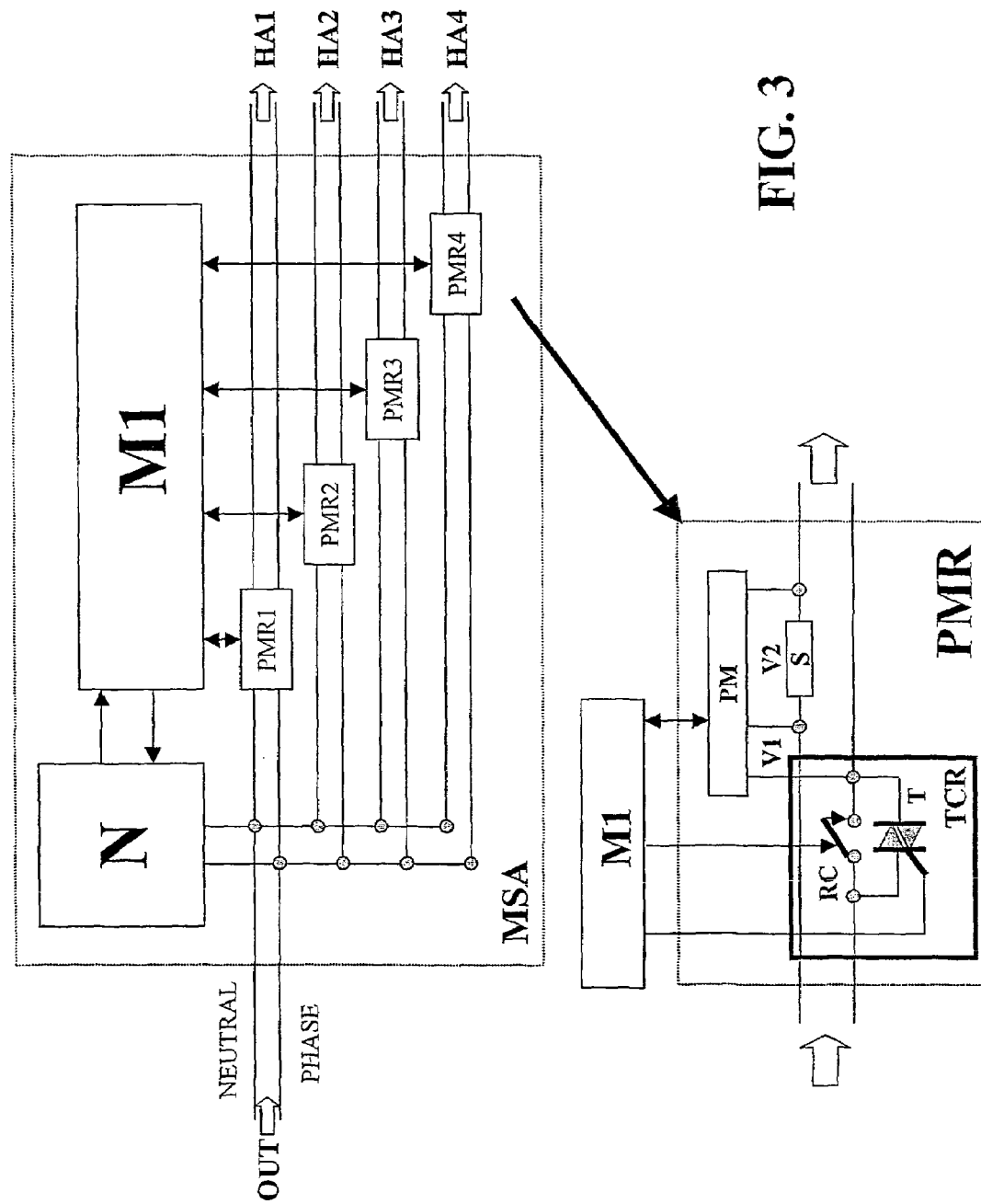
FIG. 3 shows a simplified block diagram of the monitoring device of FIGS. 1 and 2.

The blocks PM, TCR and S of FIG. 2 are contained in a block PMR, which is hatched; as mentioned, the device MSA comprises however a set of blocks PMR, which in the non limiting example of FIG. 3 are four and indicated with PMR1–PMR4.

As it can be imagined, the presence of a plurality of blocks PMR, being managed by the same microcontroller M1, allows for the contemporaneous control and/or dialog with a corresponding number of electric users (i.e. the four ones being indicated in the non limiting example with HA1–HA4).

Since the most expensive part of the device MSA is represented by the communication node N, consisting as said above of the power line modem of block PLM and of the Neuronchip of block NC of FIG. 2, a device MSA fitted with "k" blocks PMR (k=4 in the example of FIG. 3) will prove according to the invention far more convenient and easier to use compared to the solution of equipping each household appliance of a respective communication node.

2. General Principle of Operation of the Device According to the Invention

As previously mentioned, the device MSA is capable of measuring at least one among the various electric quantities (current, voltage, power factor, power, energy) being associated to the operation of the electric users HA1–HA4 and to communicate teh result of the measure to the microcontroller M1.

According to the invention, through the study of the of trend in the time of one or more of said quantities, the device MSA is capable of generating information which allow for evaluating the functional status of the electric user and identifying the type of work cycle or program being performed by the same electric user. Moreover, on the basis of the past history (i.e. the number and the type of work cycles performed), properly stored in the memory MEM, the "wear status" of the main components of the electric user itself can be estimated and, consequently, an appropriate preventive maintenance plan can be elaborated.

From the analysis of the above electric quantities, which the microcontroller M1 carries out by interpreting the measurements performed by block PM, it is in fact possible to monitor the operation of an electric user, to identify the number and type of work cycles performed both instantaneously and day by day, as well as to detect possible faults.

This is obtained by comparing, through an appropriate software of the microcontroller M1, the profiles of the cited electric quantities with reference profiles being representative of normal operating conditions of the electric user, which are contained in the memory of the same microcontroller.

The above reference profiles are coded in the memory of the microcontroller M1, on the basis of the results of experimental analysis performed on various types of products, to which the device AI can be associated to.

For a better understanding of the above concept of "reference profile", for instance with a specific reference to current absorptions only, let us now consider a standard operation cycle of a dishwashing machine HA3 which, starting from its initial phase, may typically comprise the following phases:

the opening of a solenoid valve for the water supply from the household water mains;

the switching of an electromechanical pressure-switch upon reaching a determined water level in the machine tub, with the consequent closure of the above solenoid valve;

the activation of an electric heater for heating the water in the tub;

the detection, by means an appropriate sensor, of the achievement of the water temperature as provided for by the washing cycle, with the consequent deactivation of the above heater;

the activation, for a determined time, of the electric motor of a recirculation pump of the water within the tub;

the activation of a pump for the drain of the washing water, and so on for all the operations which are progressively executed during the various phases of the selected washing cycle.

It is clear that the above operations cause, into substance, a determined sequence of current absorptions from the electric mains by the dishwashing machine, which differ between them; such a sequence of current absorptions or "profiles" may be described by means of appropriate parameters (a set of values of current absorption correlated to their relevant duration), which are obtained through experimental activities, which are part of the "reference profiles" for the above household appliance.

Therefore, in the memory associated to the micro-controller M1 a plurality of such reference profiles will be contained, each one of them relating to a given household electric user and representative of its normal operation, which the device MSA will use for monitoring the correct operation of the various users and for obtaining the information relating to their mode of use, either instantaneously and day by day.

It should be noticed that, due to the availability of said reference profile, the control system of the monitoring device MSA is perfectly able to recognize in an autonomous way the type of electric user being associated to the various outlet PC1–PC4; in fact, following its installation, the device MSA can recognize, upon occurrence of the first cycle (or the first cycles) of operation of each of the associated household appliances, the type of the same appliances by the analysis of the various electric quantities (current, voltage, power factor, power, energy) which characterize their operation, and their comparison with the stored reference profiles.

As an alternative to said "self-learning" method, in any case, the device MSA could be directly informed by the same electric users concerning their type, in the event that teh electric are suitably pre-arranged for that purpose (for instance by means of the communication techniques which will be described hereinafter).

By way of example, the above setting means STE may consist of a set of micro-switches, of the dip-switch type, each one featured by an ON (logic level "1") and OFF (logic level "0") position, in such a number to permit an adequate plurality of binary combinations. For instance, by a dip-switch with four micro-switches, one among 16 different electric users can be selected, to which the relevant operation profiles will be associated. Or, presuming always by way of example, the use of two dip-switches with 4 switches each, the first one may be associated for selecting the electric user family (such as refrigerating appliance) and the second for the product type (such as a horizontal freezer, or a simple refrigerator or still a refrigerator-freezer with a single compressor, or a refrigerator-freezer with two compressors, etc . . . ).

A further possible implementation, being simpler and particularly suitable for the case of the household appliances of a built-in kitchen, is that of preventively foresee the type of household appliance to be associated to each outlet PC1–PC4, which therefore will bear proper indications for that purpose in this way, for instance, the microcontrollore M1 of the device MSA will know in advance that an oven is associatent to the outlet PC2, a dishwasher is associated to the outlet PC3, and so on, From the above it results how the microcontroller M1, by knowing the type of electric user and the relevant reference profiles, is able to detect with good approximation the operations being performed by the electric user and likely faulty operating conditions, on the basis of the current absorption actually detected instant by instant though the sensor PM.

Obviously, different operation programs of a laundry washing machine determine, in general, current absorptions with different duration and different distribution in time, i.e. different reference profiles. For example, in the case of a strong washing cycle for a laundry washer, the water heating will be at a high temperature (e.g. 90° C.) and, additionally, the motional steps of the machine drum containing the laundry will be stronger (i.e. rotation phase lasting longer than the rest intervals); on the contrary, a washing cycle for delicate laundry will have a water heating at a lower temperature (e.g. 40° C.) and short and light drum motions. Therefore, in the first instance (strong wash cycle), the duration of the current absorption by the water heater and by the drum motor will last considerably longer compared to the second instance (delicate wash cycle).

Analogous considerations can obviously be made also with reference to other household electric users, being able to perform a plurality of different functions or work cycles as selected by the user, such as a dishwasher, an oven, a laundry dryer, and so on.

Therefore, as it can be seen, through the analysis of the current absorptions, the monitoring device MSA is perfectly capable of recognizing with good approximation the operation cycle (or program) being performed by the electric user; by the presence of an appropriate non-volatile memory MEM, the device MSA is also capable of permanently storing the number and the type of performed programs, i.e. the history of the modes of use of the electric user.

It is also quite clear how, on the basis of the above described analysis principle, the monitoring device MSA, is capable of recognizing not only the number and the type of programs performed, but also capable of detecting possible malfunctions of the electric user.

Let us consider, by way of example, the case of a laundry washing machine, which is usually fitted with a washing water heater whose power is in the order of 2 kW. It is clear that, in case the monitoring device MSA, following the start of a machine cycle, does not detect the typical current absorption caused by the heater activation, this is indicative of a possible malfunction of the heater, or of the system controlling its activation.

Another example may be described in relation to the analysis of the operation ratio or duty cycle of the compressor of a refrigerator or freezer, i.e. the compressor ON time referred to the total cycle time (ON time+OFF time). It is in fact clear that if, at a same room temperature detected in a known way, the compressor activation time (whose current absorption is detected by the device MSA) tends to slowly but gradually increase in time, this indicates a malfunction which is reducing the efficiency of the refrigerator, probably due to a leakage of the refrigerating fluid caused by microfractures in the refrigeration circuit ducts (typically in correspondence of welds), or to an unusual ice accumulation in correspondence of the evaporator area, leading to a consequent less efficient thermal exchange with the environment inside the refrigerator itself.

Another type of detection of malfunction, also related to a refrigerating appliance, may be referred to the analysis of the compressor "spurt", i.e. the transitory current overabsorption which occurs in occasion of the activation of the compressor itself. In particular, if such a spurt is shorter than normal, this means that the compressor is encountering a low resistance torque associated to the starting of the circulation of the refrigerating fluid within the refrigeration circuit. This circumstance may indicate that the quantity of the refrigerating fluid available in the refrigeration circuit is reduced, due to micro-fractures as described above.

Another type of detection of malfunction, also referred to a refrigerator, concerns the situation where, due to a high temperature of the external environment (detected with known means by the monitoring device MSA, not represented for simplicity's sake), the compressor remains permanently active, so causing an excessive accumulation of ice on the evaporator area, and consequently a gradual performance degradation, also associated to a very high power consumption. This is caused by the excessive thermal dispersions towards the external environment, which hinders to reach the compressor deactivation threshold, being managed by a conventional electromechanical thermostat. In such an event, the monitoring device MSA, after easily detecting the malfunction, can solve the problem causing a forced pause to the compressor by interrupting the supply voltage. This interruption of the supply voltage, obtained by activating the relay RC (FIG. 2) will last enough to allow the complete defrosting of the evaporator area, the value of such a duration being a parameter contained in the memory of the microcontroller managing the monitoring device MSA itself.

Finally, another type of detection of malfunction, related to the instance of a freezer, concerns the possibility of identifying the faulty condition of the compressor. A prompt detection of such a condition, which is very simple since being associated to an excessively long pause of the compressor (compared to those of normal cycling, being stored in the memory of the microcontroller of the device MSA), is quite important if combined with an alarm signalling system (such as the activation of an acoustic alarm, or a remote signal), since it will protect the integrity of the preserved food.

So far, only the measurement of the current absorbed by the electric user monitored by the device MSA has been taken into consideration, in view of its higher simplicity and for lower costs reasons; however, it is clear that what said above is perfectly valid for the skilled man also for the other electric quantities previously mentioned (voltage, power factor, power and energy), that the sensor PM, in the embodiment of FIG. 2, is capable of measuring.

Therefore, the monitoring device MSA is capable, by virtue of an appropriate programming, of generating locally, and on the basis of the analysis of one or more of the above cited electric quantities, different types of information.

As it is clear from the above, for the purposes of the present invention, such information can be distinguished into information of the functional, diagnostic, statistical and energetic type.

The information of the functional type relate to the current operational modes of each of the electric users connected to the device MSA. Such information, are obtained, as said, by comparing the various electric quantities of interest with the relevant reference profiles, which fact let the device MSA to recognize, with a good approximation, what the electric user is doing and make such information available outside.

The information of the diagnostic type relate to the operating quality of each of the electric users HA1–HA4, i.e. they supply indications on the efficiency or functional status of their components. Such information are the result of the detection, by the monitoring device MSA, of deviations which are considered significant between the measured electric quantities the ones defined by the relevant reference profiles. The information of the diagnostic type are stored by the microcontroller M1 in a proper area of the memory means MEM, and are then made available for technical service purposes.

The information of the statistical type relate on the other hand to the operation statistical data, which practically represent "the history" of the electric user (both from a standpoint of its operations and/or functions performed, and the modes of use by the consumer), which are therefore suitable for supplying indications concerning the wear status of the components of the electric user. These information consist practically of the number and type of work cycles or programs performed by the electric user, which the microcontroller M1 can recognizes through an appropriate program utilizing the same functional information, and which the microcontroller stores and updates in time in a suitable area of the memory means MEM.

Finally, the information of the energetic type relate to the distribution of the electric energy consumption in the day (for instance being memorized in MEM at regular intervals of 5 minutes each, or other time interval deemed to be more appropriate), in the week (for instance being memorized in MEM at regular intervals of one hour each, or other time interval deemed to be more appropriate), in the month (for instance being memorized in MEM at regular intervals of a day each) and in the year (for instance being memorized in MEM at regular intervals of one month each).

The information of the energetic type are stored by the microcontroller M1 in a proper area of the memory means MEM, for being then used in view of an optimization of the energetic consumption, in particular in the case where a management system is provided of the energy cost, being differentiated depending upon the daytime of use.

Figure 9:
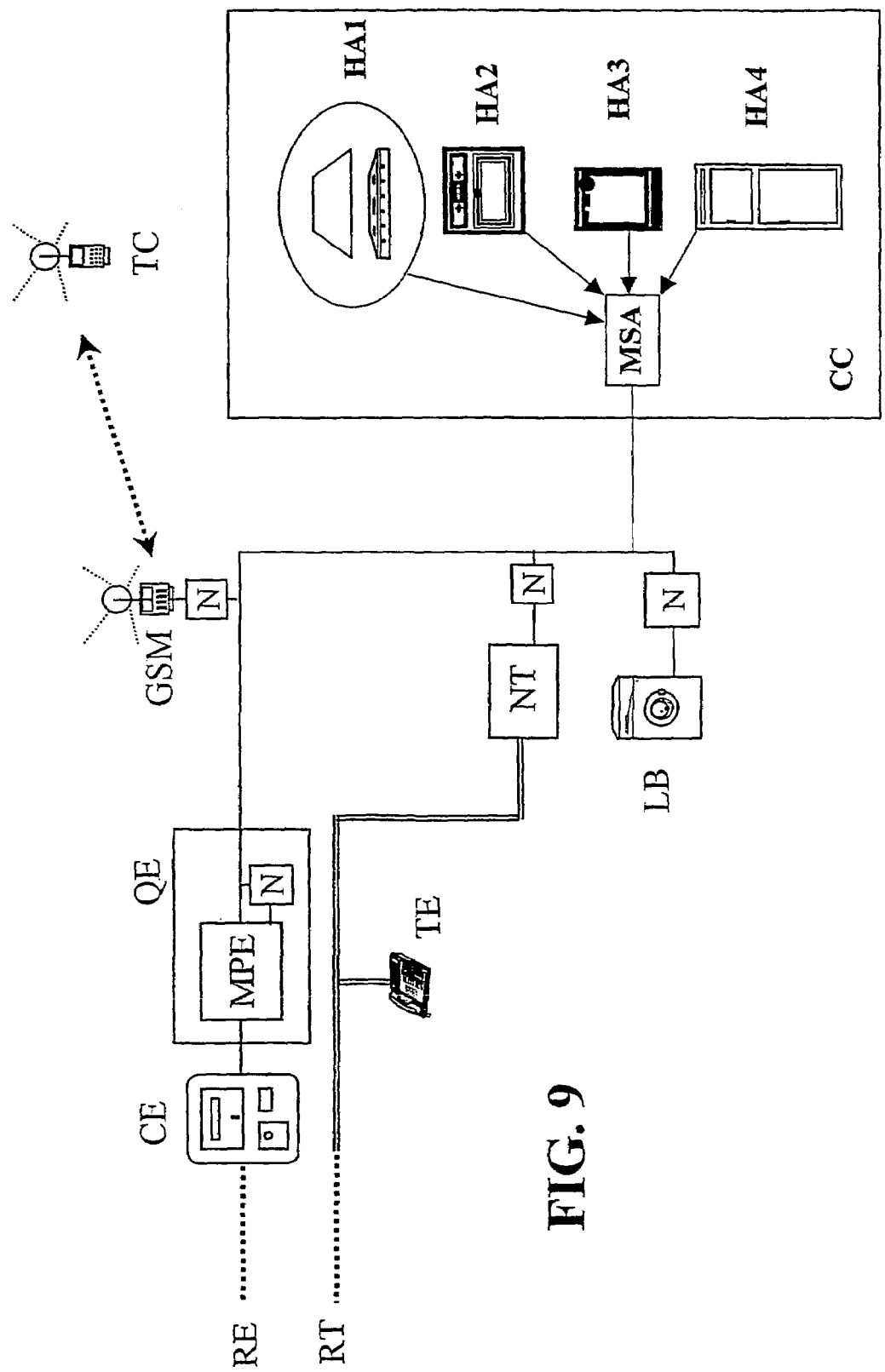
FIG. 9 shows in a schematic way a system of household electric user, in which the monitoring device according to the present invention can prove to be of advantageous use.

As it will become further apparent with reference to the application example represented in FIG. 9, the information of the functional type may also be used for the purpose of realizing a rational management of the consumption of electric energy in a household environment, or for allowing the remote control of the electric user connected to the device MSA.

The information of the diagnostic type are used, on the contrary, for making easier the servicing of the electric user they refer to.

The information of the statistical type are used for carrying out an estimation of the wear status of the components constituting said electric user, in order to allow the planning of appropriate preventive maintenance activities.

Finally, the information of the energetic type are used for allowing the user to have a higher consciousness of his own energetic consumption, in order to avoid waste of electric energy and benefit of reductions relating to the differentiated energy costs.

3. System for the Data Transmission/Reception of the Device According to the Invention In the preferred embodiment of the invention, the device MSA can also be programmed for exchanging information or data with the electronic control system of the various electric users HA1–HA4, duly arranged for that purpose, by using as a transmission means the supply cables of the same users.

This is obtained, according to the invention, by means of two particular techniques of data transmission/reception, which will be described hereinafter.

Figure 5B:
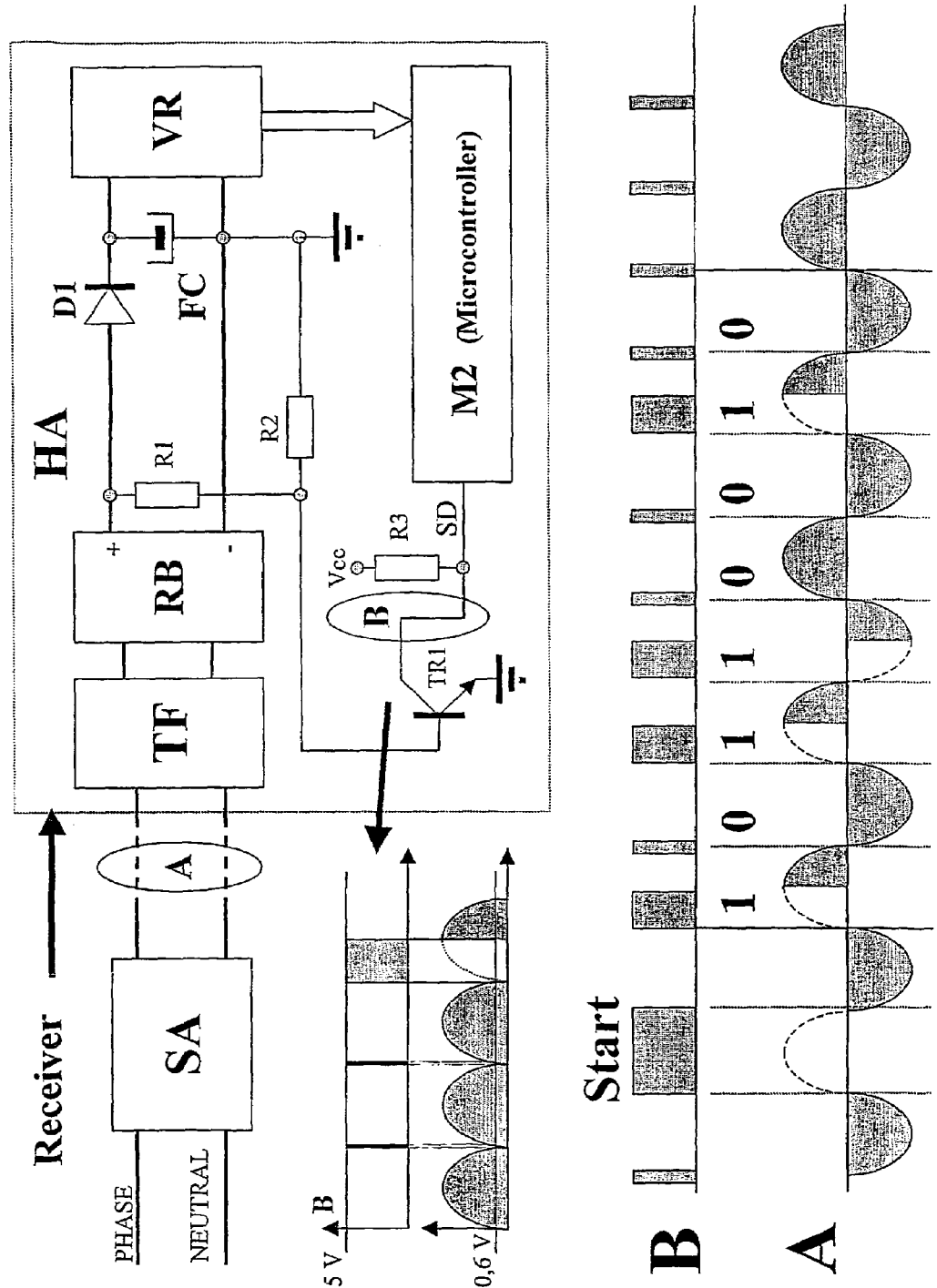
FIGS. 5*b*, 5*c* and 5*d* illustrate three further possible embodiments of a receiving stage of binary information being comprised in the control system of one or more of the electric users HA of FIG. 1.

1. First Technique of Data Transmission/Reception on Electric Network from the Device "MSA" to a user "HA": Modulation of the Supplied Power The first technique of data transmission/reception on electric network used by the device MSA according to the invention uses, as coding means for the binary information, appropriate controlled lacks or interruptions of the electric mains, which are called hereinafter as network interruptions or voltage interruptions; this technique is featured by the two following essential elements:

a transmitter, capable of generating network interruptions or voltage interruptions in accordance with the binary information to be transmitted; a possible circuit diagram of said transmitter, which is part of the device MSA, is illustrated in the upper part of FIG. 4;

a receiver, capable of detecting and decoding said network interruptions; a possible circuit diagram of said receiver, which is part of the electronic control system of a generic user HA being associated to the device MSA, is illustrated in the upper part of FIG. 5a. Possible variant embodiments of this receiver are illustrated in the upper part of FIGS. 5b, 5c and 5d.

The technique of data transmission/receiving on electric network based on the modulation/demodulation of the supplied power according to a basic implementation of the present invention provides for the association of one bit to each half-wave of the mains voltage; conveniently, a fixed time, such as 5 mSec may be assigned to every network interruption (relating to each half wave), or another more appropriate value also in view of the application in use. Therefore, considering that the mains frequency is 50 or 60 Hz (Europe/USA, Japan), the data baud rate equals 100 or 120 bps (bits per seconds), respectively.

1.1 Description of the Transmitter for the Network Interruptions Technique

The description of the transmitter for the network interruptions according to the present invention relates to FIG. 4. It should be notice that said transmitter is implemented within each of the block PMR of FIGS. 2 and 3, and is constituted by the ensemble of the microcontroller M1 and the block TCR of FIG. 2.

According to the basic version of the present invention, the transmitter associated to the control system of the monitoring device MSA generates network interruptions, being of controlled duration within a predetermined time interval, by means of a solid state switch or relay, being represented by the triac T (already indicated in FIG. 2), whose actuating signal G (applied to the gate of the triac T) is appropriately synchronized with a signal ZD which detects the zero-crossing of the mains voltage.

The triac T is arranged in parallel to the normally closed contact RC of an appropriate electromechanical relay, capable of managing the current flow to the electric user HA when there is no need for data transmission, i.e. no needs of generating network interruptions. Moreover, the triac T has the further purpose of protecting the same contact RC, by intervening every time before it switches, to avoid sparking (photo-voltaic arc) and its consequent wear. This is obtained by switching the contact RC of the relay always with the triac T being closed (enabled), according to a procedure known to the man skilled in the art, which can be summarized in the sequence of the following three operations:

1. closure of the triac T;
2. energization (or de-energization) of the coil of the relay RC;
3. opening of the triac T after the contact of the relay RC has terminated its switching operation, reaching a stability state (no contact bouncing).

The relay RC, the triac T and the synchronism signal ZD are managed by the microcontroller M1.

As to the coding logic of the binary data to be transmitted, two possible procedures are provided according to the basic version of the present invention:

positive logic coding: a logic "1" corresponds to the presence of a network interruption and a logic "0" corresponds to the absence of the same in the period of time being provided for the data transmission;

negative logic coding: a logic "0" corresponds to the presence of a network interruption and a logic "1" corresponds to the absence of the same in the period of time being provided for the data transmission.

The graph chart illustrated in the lower part of FIG. 4 highlights by mere way of non limiting example the transmission of a sequence of 8 bit, using a positive logic coding, wherein the duration of the network interruptions associated to the logic "1s" equals a fourth of the mains period (5 mSec, should the mains frequency be 50 Hz).

This bits sequence is preceded by a transmission start signal indicated by "Start" which, by way of non limiting example, is represented by a network interruption lasting a mains half cycle (10 mSec, should the mains frequency be 50 Hz).

The upper part of the graph chart in FIG. 4 indicates a temporary sequence of the alternated half-waves of the mains voltage (voltage A applied to the user HA by the device MSA—see upper part of FIG. 4), whereas the lower part of the graph chart of FIG. 4 indicates the pulses of the signal G applied by the microcontroller M1 to the gate of the triac T, according to the logic level of each bit to be transmitted.

FIG. 8a represents, by way of non limiting example, a flowchart indicating a possible communication protocol to be adopted for transmitting digital information on electric network according to the embodiment of the present invention illustrated in FIG. 4.

Block 1 of this flowchart is a start block; block 2 is a test block, wherein the control program checks the likely start condition of the transmission. If the start condition of the transmission is not verified, the control remains at block 2, otherwise it passes to block 3. Block 3 is a test block, wherein the control program searches the synchronism condition with the zero-crossing of the mains voltage. If the synchronism condition is not verified, the control remains at block 3, otherwise it goes on to block 4, where the transmission starts.

Blocks 4, 5 and 6 represent schematically, by way of non limiting example, the following three phases of the transmission of binary data:

1. sending of the signal (STX) of start of transmission, i.e. the signal indicated with "Start" in FIG. 4;
2. sending of a fixed sequence of bits which is associated to the digital information to be transmitted;
3. sending of the checksum control signal relating to the transmitted sequence of bits.

Once the checksum has been sent, the control goes over to block 7, which is a test block in which an acknowledge signal ACK is waited of the correct reception by the control system of the receiving electric user HA of FIG. 4.

If there is no ACK signal, the control goes over to block 8, which is a test block checking the achievement of a determined time-out, within which the signal ACK by the receiving device HA should arrive.

If the signal ACK does not arrive within the maximum pre-set time-out, the control goes back to block 3 for a complete repeat of the transmission, whereas, if the above signal of correct reception arrives within the pre-set time-out, the control is released to block 9, which is a block of transmission end.

3.3 Description of the Receiver for the Network Interruptions Technique

Figure 5C:
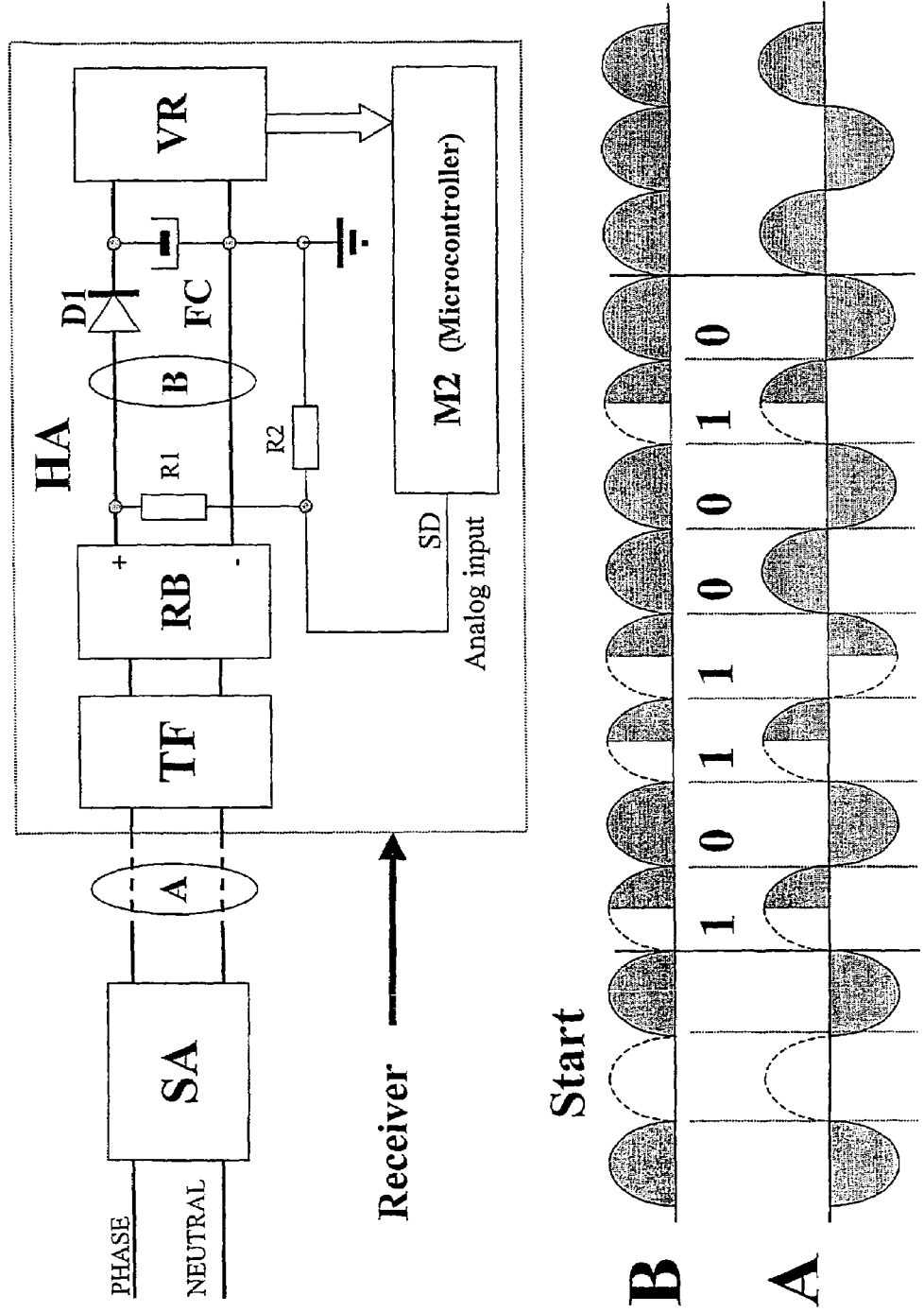

The description of the receiver of network interruptions according to the present invention refers to FIGS. 5a, 5b and 5c, wherein three possible circuit embodiments are illustrated by way of non limiting example, respectively.

A first circuit embodiment of the receiver of network interruptions according to the basic version of the present invention is represented in FIG. 5a, where TF (Transformer) indicates a standard transformer contained in the control card of the electric user HA; RB (Rectifier Bridge) indicates a diodes bridge used for rectifying the output voltage from the secondary of the transformer TF; FC (Filtering Capacitor) indicates a filter capacitor; VR (Voltage Regulator) indicates a voltage regulator and M2 indicates a microcontroller managing the control system of the electric user HA.

The receiver shown in FIG. 5a, being associated to the control system of the electric user HA, decodes the network interruptions produced by the transmitter of FIG. 4 by means of two diodes D1 and D2, whose anodes are located at the terminals of the secondary of the transformer TF.

The output half waves of the secondary of the transformer TF, rectified by the diodes D1 and D2, are applied to the base of a transistor TR1 through a resistive divider consisting of the resistors R1 and R2, generating a positive pulse when the transistor TR1 is locked (0.6 Volt applied to the lower base).

As a result, upon absence of network interruptions, the signal B in correspondence with the collector of the transistor TR1, applied to the input SD of the microcontroller M2, is normally low, save around the zero crossing, where a positive pulse is generated (as indicated in the graphic representation of detail on the left side of FIG. 5a), of the output signal from the common cathodes of the diodes D1 and D2 amplified by the transistor TR1. For simplicity's sake, in this representation of detail, it has been considered the value of the resistor R2 as being much higher than the one of the resistor R1; therefore, the transistor TR1 is deemed to be locked when the voltage on the cathodes of the diodes D1 and D2 is lower than 0.6 Volt.

More in general, since the amplitude of the above zero-crossing pulse depends upon the divider R1–R2, the latter will be chosen accordingly for the application, however, without any limits to the generality of the present invention.

On the contrary, in the presence of a network interruption, the signal B on the collector of the transistor TR1 takes a high value, equal to Vcc (output voltage regulated at the voltage regulator VR) due to the presence of a pull-up resistor, indicated with R3. The result is the trend of the signal B (highlighted in the upper part of the graph chart in FIG. 5a), expressed as a function of the signal A (highlighted in the lower part of the same graph chart) and applied to the electric user HA through the monitoring device SA.

As it can be easily noticed, the information ("Start", logic value "one", logic value "zero") is contained within the duration of the signal B which is generated in correspondence with the transistor TR1.

A second possible circuit embodiment for the receiver of network interruptions according to the present invention is represented in FIG. 5b, where TF is the transformer of the control card of the electric user HA, RB is the diodes bridge employed for rectifying the output voltage from the secondary of the transformer TF, D1 is the diode used for uncoupling the output of the secondary of the transformer TF, FC is the filter capacitor, VR is the voltage regulator and M2 is the microcontroller managing the control system of the user HA.

Compared to the previous circuit embodiment, the half waves exiting the transformer TF are rectified by the diodes bridge RB, instead of the two diodes D1 and D2 of FIG. 5a. The signal is supplied to the base of the transistor TR1 always through the resistive divider R1–R2.

As it can be noticed in the graphic representation of detail on the left side: of FIG. 5b, the signal B taken from the collector of the transistor TR1 has a trend substantially matching the one already described with reference to FIG. 5a.

Also, the graph chart in the lower part of FIG. 5b highlights the trend of the signal B as a function of the signal A, which is analogous to the one shown in FIG. 5a, as it can be seen. In both solutions (FIG. 5a and FIG. 5b), the signal applied to the input SD of the microcontroller M2 is a digital signal and the various types of information brought by the decoded signal are distinguished based on the duration of the pulse being produced.

With reference to the duration of the above pulse, three different types of information can be distinguished:
- a short zero-crossing pulse, whose duration depends substantially on the value of the resistive divider R1–R2, which in the figure corresponds to a logic "zero" being sent (assuming the choice of a positive logic);
- a pulse, whose duration is equal to the network interruption, which in the figure corresponds to a fourth of the mains cycle, corresponding to a logic "one" being sent (assuming the choice of a positive logic);
- a start pulse, indicated with "Start", whose duration is equal to a mains half cycle.

A third possible circuit embodiment of the receiver of network interruptions according to the present invention is represented in FIG. 5c, where TF is the transformer of the control card of the electric user HA, RB is the diodes bridge employed for rectifying the output voltage from the secondary of the transformer TF, D1 is the diode used for uncoupling the output of the secondary of the transformer TF, FC is the filter capacitor, VR is the voltage regulator and M2 is the microcontroller managing the control system of the user HA.

The only difference compared to the circuit embodiment of FIG. 5b is that the signal applied to the input SD of the microcontroller M2 is an analogic signal instead of a digital signal. This signal, whose amplitude is appropriately adapted to the input SD through the resistive divider R1–R2, is decoded with the aid of an appropriate analogic-digital converter being present within the microcontroller M2.

The upper part of the graph chart shown in FIG. 5c represents the trend of the signal B expressed in function of the signal A, being highlighted in the bottom part of the same graph chart, applied to the electric user HA through the monitoring device MSA.

As it can be noticed, all the three circuit embodiment examples of the receiver of network interruptions described above, have a minimum electronic cost, matching in fact to that of a standard zero-crossing detecting circuit. However, considering that such a circuit is anyway required for the normal operation of the control system of the electric user HA, it is clear how the detection of the network interruptions according to the present invention practically occurs at zero cost.

FIG. 8b represents by way of non limiting example a flowchart reporting a possible communication protocol to be adopted for receiving digital information on electric network, transmitted through the technique of network interruptions, according to the embodiments of the present invention illustrated in the FIGS. 5a, 5b and 5c.

Block 10 in this flowchart is a start block; block 11 is a test block, wherein the control program checks the likely arrival of the signal STX previously indicated with "Start", which indicates the transmission start by the control system of the monitoring device MSA. If the transmission start condition is not verified, then the control remains at the block 11; otherwise, it is passes to block 12.

Block 12 is an initialisation block of a counter N, wherein the number NBT of the bits provided in the transmission is stored.

The block 12 then releases the control to the block 13, which is a test block wherein the control program researches the synchronism condition associated to the zero-crossing.

If the synchronism condition is not verified, the control remains at the block 13; otherwise it goes on to the block 14, where the real reception process starts.

Block 14 is a test block, wherein the logic level of the received bit is verified. If the logic level corresponds to "1", this value is stored in the corresponding register of the received bits; otherwise, if there is no pulse which can be associated to the logic "1" within the mains half cycle (block 16, wherein the "time-out" variable is worth 10 mSec when the mains frequency is 50 Hz), a "0" is stored (block 17).

Subsequently, the control goes on to block 18 where the value inside the register N is decreased by one unit.

Then the block 19 follows, which is a test block, wherein the register contents N is checked. If N is higher than zero, the control goes back to block 14 for acquiring the subsequent bit, whereas if N is equal to 0, the control goes to block 20, which is a test block checking the bits quality through the known checksum control technique.

Should the checksum verification have a negative result, the control goes back to block 11, where the whole transmission is repeated by the monitoring device MSA; if this verification, vice-versa, is satisfactory, the control goes on to the block 21, which sends the acknowledge signal ACK of correct reception of digital information transmitted by the monitoring device MSA.

Then the block 21 releases control to the block 22 of reception end.

3.4 Generalization of the Data Transmission Technique on Electric Network Based on Modulation/Demodulation of the Supplied Power A more general implementation of the data transmission technique on electric network described above with modulation/demodulation of the supplied power may provide, according to the present invention, for the association of several bits to every mains voltage half wave. This may be obtained, for example, by imposing a variable duration to each network interruption, expressed as a multiple of a basic duration D0 (e.g. D0=0,1 mSec), corresponding to the weight of the lightest bit (bit0=$2^0$*D0→0.1 mSec; bit1=$2^1$*D0→0.2 mSec; bit2=$2^2$*D0→0.4 mSec; bit3=$2^3$*D0→0.8 mSec).

In this case, the transmission speed may sensibly increase compared to the previous basic example (association of one bit to each half wave, with fixed duration of the network interruptions), depending on the modulation mode being adopted.

Assuming, for simplicity's sake, the use of a positive logic, the coding and the decoding of the binary data being transmitted or received, respectively, may be performed, according to the present invention in its more general version, adopting the following procedure. This coding/decoding procedure, indicated by way of non limiting example, associates a "nibble", i.e a 4-bits binary configuration, to each mains voltage half wave; some coding/decoding examples according to the above procedure are as follows:

nibble="0000": transmission/reception of the decimal number "zero" associated to the total absence of a network interruption;

nibble="0001": transmission/reception of the decimal number "one" associated to the presence of a network interruption having a duration equal to 0.1 mSec;

nibble="0011": transmission/reception of the decimal number "three" associated to the presence of a network interruption having a duration equal to 0.3 mSec;

nibble="0110": transmission/reception of the decimal number "ten" associated to the presence of a network interruption having a duration equal to 1 mSec;

nibble="1111": transmission/reception of the decimal number "fifteen" associated to the presence of a network interruption having a duration equal to 1.5 mSec.

Therefore, the ensuing transmission speed is equal to 400 or 480 bps, with reference to a mains frequency of 50 or 60 Hz, respectively.

3.5 Case of Electric User Having a Control System Supplied without a Voltage Transformer In the particular event of an electric user HA fitted with an electronic control system supplied directly from the mains through an appropriate impedance (such as of the type R–C series) instead of a transformer, the transmission and reception procedure described above has to be restricted to one half wave alone: i.e. the one supplying the electronic control system through the drop impedance of the mains voltage. In such an event, obviously, the quantity of information to be sent in one second (baud-rate) is halved, but the transmission logic remains always the same, being fully included as a particular case in the teachings of the present invention.

Figure 5D:
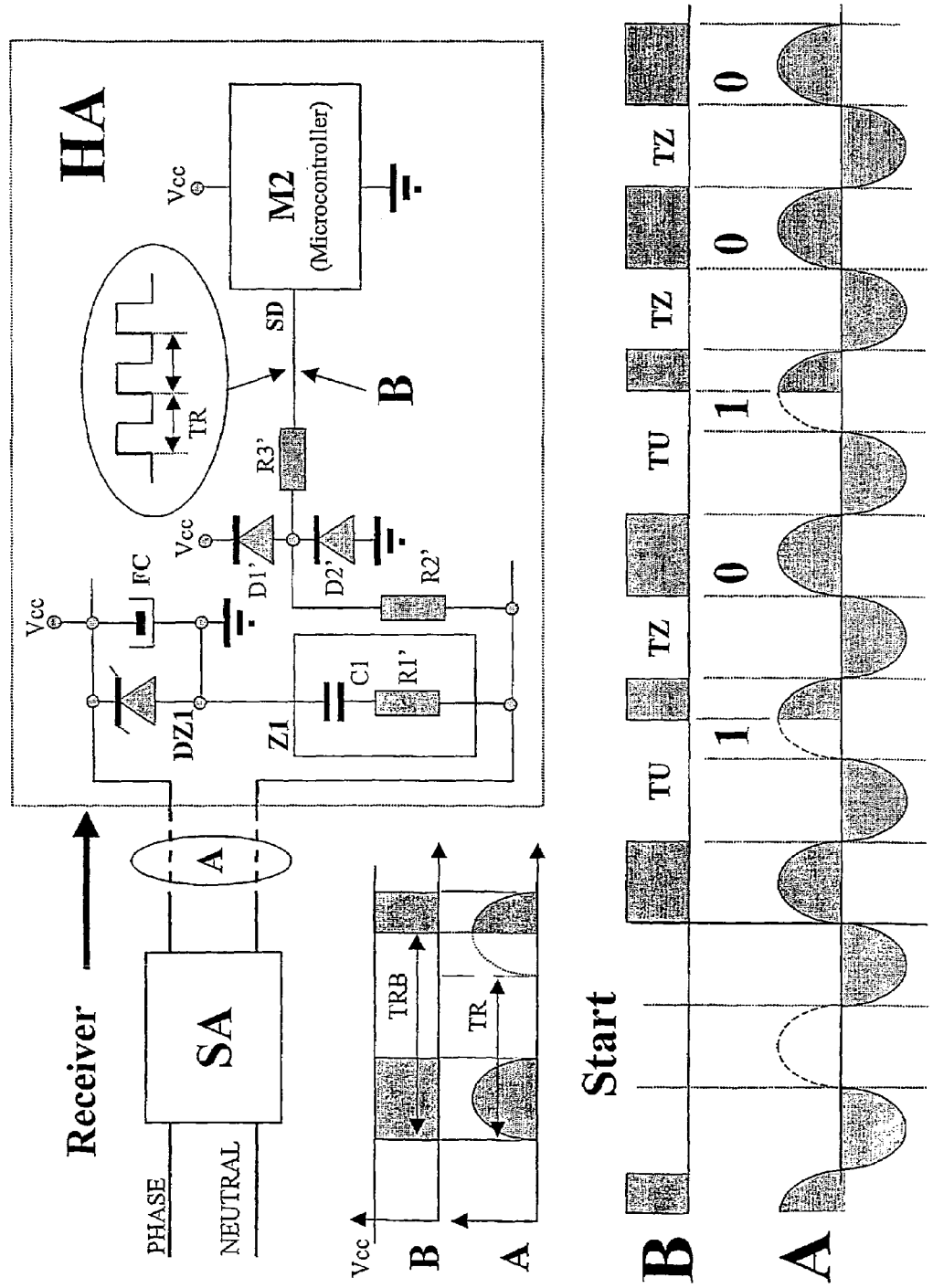

An example of a receiver of network interruptions like the one mentioned just above, associated to an electric user HA fitted with an electronic control system supplied directly by the mains voltage through a capacitive impedance is represented in FIG. 5d.

In this figure, DZ1 indicates a zener diode stabilizing the supply voltage Vcc, FC is the filter capacitor, Z1 is the drop impedance (constituted by the connection in series of a capacitor C1 and a resistor R1') supplying the system directly from the mains voltage; M2 is the microcontroller of the control system of HA, R2' is the resistor (with a high value: typically 1 megaohm) through which the zero-crossing signal is picked up; D1', D2' and R3' indicate the two diodes and the resistor protecting the input SD of the microcontroller M2 against possible transitory overvoltages, respectively.

In this instance, the useful information is associated to the half wave alone supplying the control system of HA and is contained, for example, in the time interval separating a negative edge of the signal B from its subsequent positive edge, so that the interval TU associated to a logic "one" is well separated from the interval TZ associated to a logic "zero", as graphically represented in the bottom part of FIG. 5d.

The synchronism signal picked up through the resistor R2' and presented, through R3', at the input SD of the microcontroller M2 typically consists, in the absence of network interruptions, of a square wave with 50% duty-cycle and with cycle TR equal to the cycle associated to the mains frequency (e.g.: TR=10 mSec, should the network frequency be 50 Hz). In the presence of a network interruption, on the contrary, the temporary interval TRB between two subsequent positive edges will be higher compared to the mains cycle TR, as shown in the graphic representation of detail on the left side of FIG. 5d.

It is clear that other circuit solutions, as well as other possible interpretation procedures of the coded information, are possible for the man skilled in the art to the receiver of network interruptions without departing from the novelty spirit of the invention.

Finally, it is also clear that a simplified receiver as described above may be advantageously applied by virtue of its minimum cost, also should the electronic control system of the electric user HA be fitted with a transformer, but not require a galvanic insulation between its logic mass and the network voltage.

Figure 6:
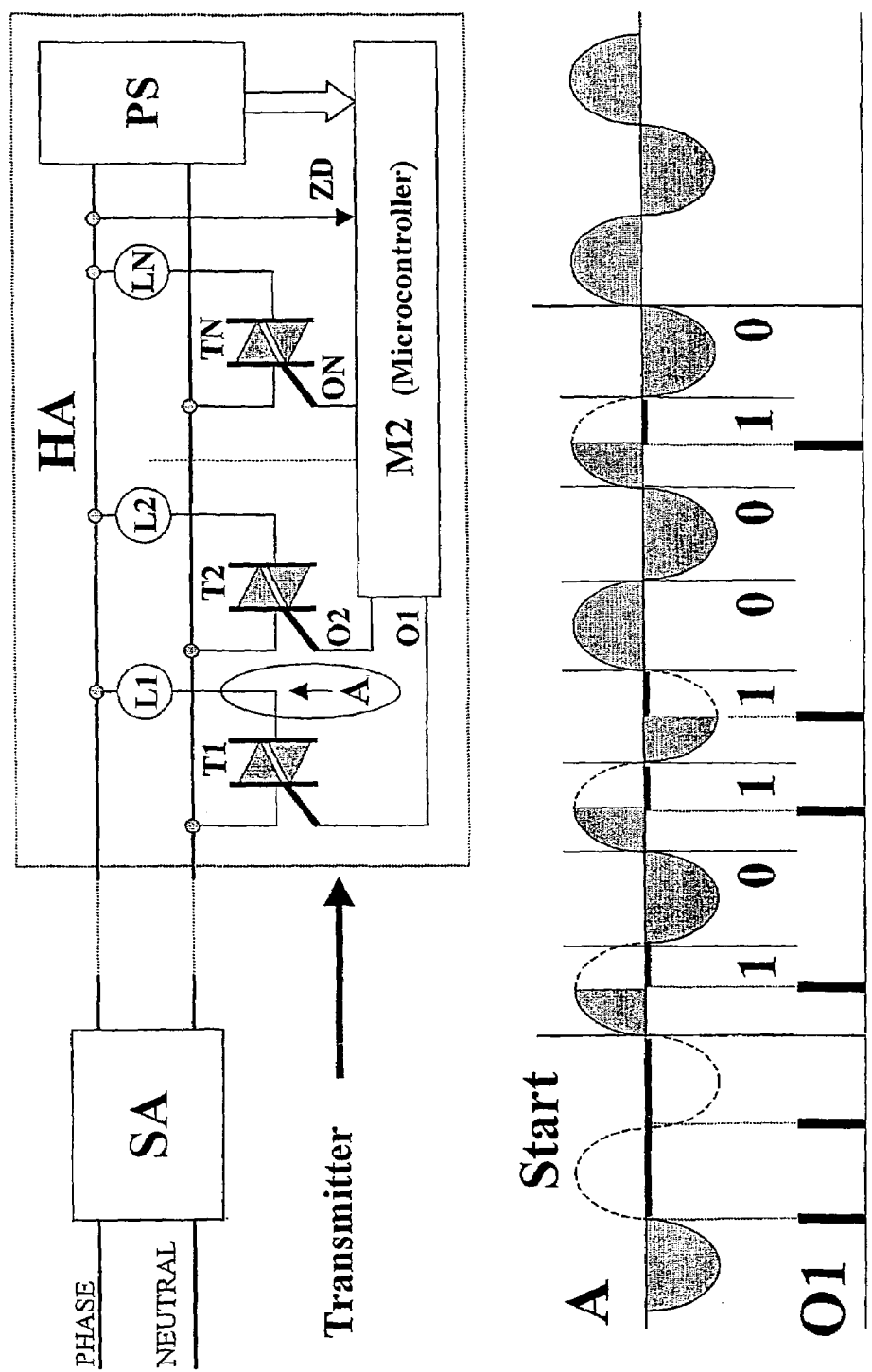
FIG. 6 shows an example of transmission stage of binary information, or transmitter, being comprised in the control system of one or more of the electric users of FIG. 1.
Figure 7:
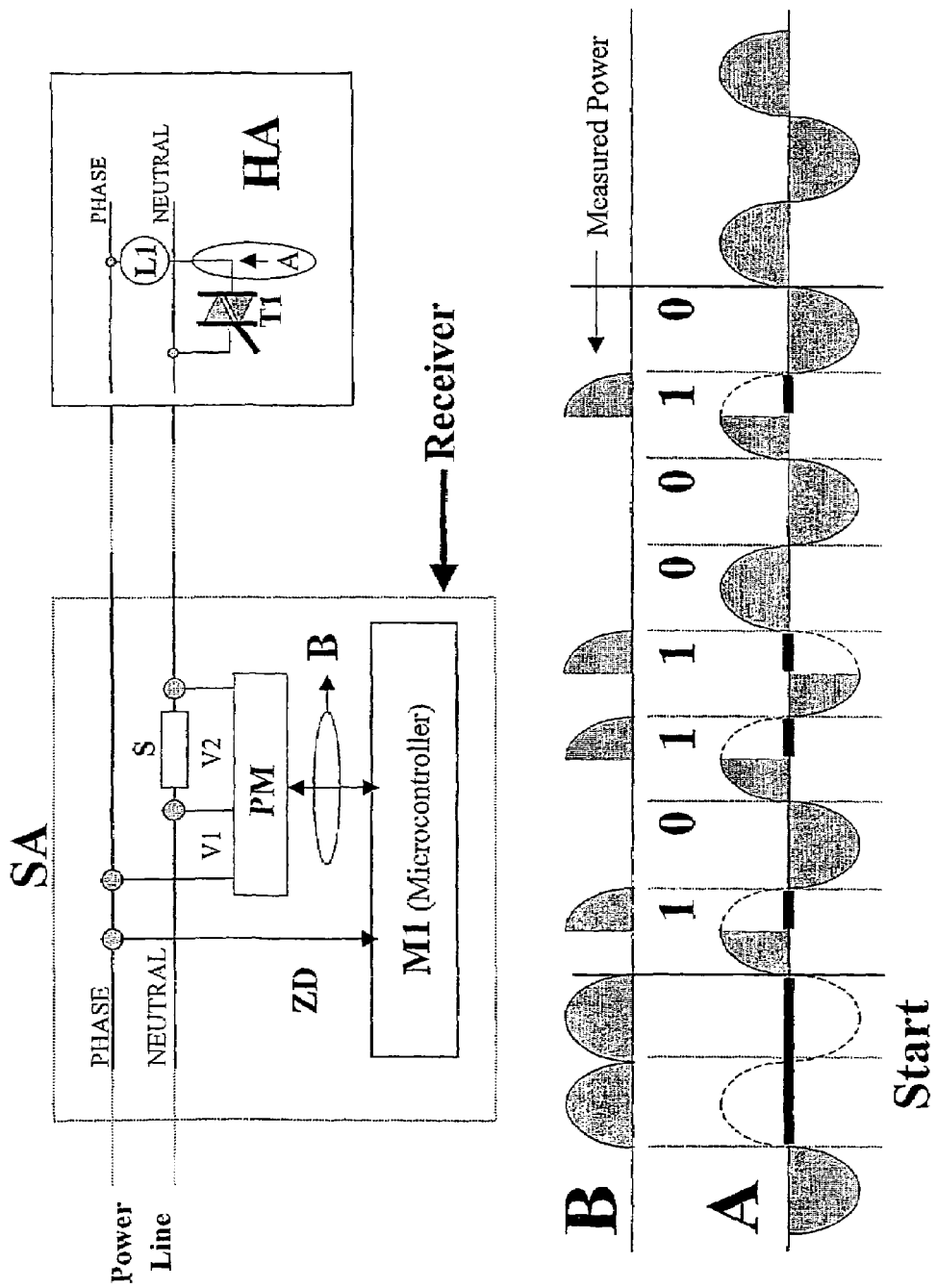
FIG. 7 shows an example of receiving stage of binary information, or receiver, being comprised in the control system of the monitoring device of FIG. 1.

4.1 Second Technique of Data Transmission/Reception on Electric Network from a User "HA" to the Device "MSA": Modulation of the Absorbed Power The second technique of data transmission on electric network according to the present invention uses, as coding means of binary information, controlled absorptions of electric power, and is featured by the two following essential elements:

a transmitter, capable of performing controlled absorptions of electric power in accordance with the binary information to be transmitted; a possible circuit diagram of this transmitter, which is part of the electronic control system of a generic user HA being associated to the device MSA, is illustrated in the upper part of FIG. 6;

a receiver, capable of detecting and decoding said absorptions of electric power; a possible circuit diagram of this receiver, which is part of the device MSA, is illustrated in the upper part of FIG. 7.

The technique for transmitting data on electric network based on modulation/demodulation of the absorbed power, according to a basic implementation of the present invention, provides for the association of one bit to each half wave of the mains voltage, to each power absorption being imposed a value which is higher than a predetermined threshold SS (e.g. SS=3 W).

In this instance, considering a mains frequency of 50 or 60 Hz, the data baud-rate equals 100 or 120 bps (bits per second), respectively.

4.2 Description of the Transmitter of Controlled Absorption of Electric Power

The description of the transmitter of controlled absorption of electric power according to the invention refers to FIG. 6.

According to the basic version of the present invention, the transmitter comprised in the control system of the electric user HA is programmed for generating controlled absorptions of electric power with the use of a solid state switch or relay, represented by the triac indicated with T1 in FIG. 6, whose activation signal O1 (applied to the gate) is managed by the microcontroller M2, supplied by means of a voltage regulator PS (Power Supply), and appropriately synchronized with the signal ZD detecting the zero-crossing.

The triac T1 is associated to a generic electric load indicated with L1, appropriately chosen between the ones being available on the electric user HA.

In the very particular event where the electric user HA should not have any load being controlled through a triac (such as when all loads are managed by electromechanical relays), according to the present invention a low cost solution will be employed, which consists of a small triac (such as a 0.8 A device in a plastic container TO92) with associated a low resistive electric load (e.g. 10 W).

As to the coding logic of the binary data to be transmitted, according to the basic version of the present invention, the following two possible procedures are provided:

positive logic coding: a logic "1" corresponds to the presence of an electric power absorption being higher than a predetermined threshold SS (e.g. SS=3 W) and a logic "0" corresponds to the absence of power absorption;

negative logic coding: a logic "0" corresponds to the presence of an electric power absorption being higher than a predetermined threshold SS (e.g. SS=3 W) and a logic "1" corresponds to the absence of power absorption.

The graph chart shown in the lower part of FIG. 6 represents by way of non limiting example the transmission of a sequence of 8 bits using a positive logic coding, wherein the power absorptions, associated to the logic "1", equal half the instantaneous power associated to the load L1 and relate to a fourth of the mains cycle (5 mSec, should the network frequency be 50 Hz).

This sequence of bits is preceded by a "Start" signal which, by way of non limiting example, is represented by an absorption equalling the full power of the load L1, associated to a mains cycle (20 mSec, should the network frequency be 50 Hz). The upper part of the graph chart shows the voltage A at the terminals of the triac T1, whereas the bottom part of the graph chart shows the pulses O1 applied by the microcontroller M2 to the gate of the same triac T1, in accordance with the logic level of each bit to be transmitted.

One of the possible communication protocols to be adopted for transmitting digital information on electric line according to the above technique, based on controlled absorptions of electric power is illustrated in the flowchart of FIG. 8a; therefore, as it can be noticed, this protocol can perfectly match the one associated to the transmitter of network interruptions previously described (par. 3—Description of the transmitter of network interruptions).

4.3 Description of the Receiver of Controlled Absorptions of Electric Power

The description of the receiver of controlled absorptions of electric power according to the present invention relates to FIG. 7, where PM, S and M1 indicates respectively the metering device of the electric quantities (among which power), the detector/resistive shunt or toroid or other type of current detector) and the microcontroller equipping the monitoring device MSA, already mentioned with reference to FIG. 2.

The microcontroller M1, which manages the receiver in the monitoring device MSA according to the basic version of the present invention, detects the presence of electric power absorptions by the user HA and determines their entity through the continuous metering of the power supplied in correspondence with each half wave of the mains voltage, through the device PM.

The decoding of the controlled absorptions of electric power according to the present invention, represented by way of non limiting example in the graph chart reported in the bottom part of FIG. 7, uses a positive logic (i.e. a logic "1" is associated to each power absorption related to a half wave).

The bottom part of the graph chart represents the trend of the mains voltage A measured at the terminals of the triac T1 employed for the communication from the electric user HA, whereas the upper part of the graph chart represents the power B measured by the device PM.

The current detector S represented in FIG. 7, by way of non limiting example, is a precision resistor with a low thermal coefficient (e.g. S=5 mΩ 1%), whose voltage at the terminals (V2) is proportional to the current crossing it, according to the known Ohm law.

More generally, according to the present invention, said detector S may be represented by any other current detector (such as a current transformer, a Hall-effect sensor, and so on). A possible communication protocol to be adopted for receiving information on electric network according to the above technique based on controlled absorptions of electric power is illustrated in the flowchart of FIG. 8b; therefore, as it can be noticed, this protocol can perfectly match the one associated to the receiver of network interruptions previously described (see par. 4—"Description of the receiver of network interruptions").

Finally, as to the decoding logic of the received binary data, according to the basic version of the present invention, the two procedures described above with reference to the transmitter apply (see par. "Description of the transmitter of controlled absorptions of electric power").

4.4 Generalization of the Data Transmission Technique on Electric Network based on Modulation/Demodulation of the Absorbed Power A more general implementation of the data transmission technique on electric network based on modulation/demodulation of the absorbed power described above according to the present invention may provide for the association of several bits to each half wave of the mains voltage. This may be obtained for example by imposing a value of variable entity to each controlled absorption of electric power, being expressed as a multiple of a basic absorption P0 (e.g. P0=1 Watt) corresponding to the weight of the lightest bit (bit0=$2^0$*P0→1 W; bit1=$2^1$*P0→2 W; bit2=$2^2$*P0→4 W; bit3=$2^3$*P0→8 W).

In this case, the transmission speed may sensibly increase compared to the previous basic example (association of one bit to each half wave); assuming the use of a positive logic, for simplicity's sake, according to a more general version of the present invention, coding and/or decoding of binary data transmitted or received, respectively, may be performed through the procedure described here below.

This coding/decoding procedure, indicated by way of non limiting example, associates a nibble, i.e. a binary configuration of 4 bits, to each half wave of the mains voltage; the following are a few coding/decoding examples according to the above procedure:

nibble="0000": transmission/reception of the decimal number "zero" associated to the absence of power absorption;

nibble="0001": transmission/reception of the decimal number "one" associated to a power absorption equal to 1 Watt;

nibble="0011": transmission/reception of the decimal number "three" associated to a power absorption equal to 3 Watt;

nibble="0110": transmission/reception of the decimal number "ten" associated to a power absorption equal to 10 Watt;

nibble="1111": transmission/reception of the decimal number "fifteen" associated to a power absorption equal to 15 Watt.

The ensuing transmission speed equals 400 or 480 bps, as for the case described under par. 3.4, with reference to a network frequency of 50 or 60 Hz, respectively.

Finally, it should be pointed out that in agreement with the above description of the device PM (power meter) represente in FIGS. 2 and 7, the accurate power measure (derived quantity) performed by the device CS5460 by Cirrus Logic can be replaced with a simple current measure (primary quantity), without departing from the novelty spirit of invention. In this case, in fact, the concept of "absorbed power" associated to FIGS. 6 and 7 is simply replaced by the concept of "absorbed current", without jeopardizing in any way the present invention.

5. Examples of Use of the Power Modulation Techniques

Considering that both the data transmission techniques on electric network described above concern the modulation of the supplied power or absorbed power, this type of modulation is herein called power modulation.

The above data transmission techniques on electric network may be advantageously used, according to the present invention, both in an individual mode and in a combined mode;

moreover, the present invention may be applied according to its basic version or to its more general version.

5.1. First Example of Use of the Device MSA (Reception of Diagnostic Information)

In order to make a specific example of use of the transmission/reception techniques previously indicated, reference can be made to FIG. 2, by also assuming an implementation of the system in its basic version (i.e featured by the transmission/reception of one bit for each half wave of the mains voltage).

As said, the block PM of FIG. 2 represents the block for receiving the information transmitted by the user HA in the form of controlled absorptions of electric power, as for the technique previously described; the block TCR represents, on the other side, the block for transmitting by the monitoring device MSA the information coded through the network interruptions technique, previously described.

Vice-versa, the control system of the generic user HA contains two appropriate functional blocks: one for transmitting digital information using the technique based on controlled absorptions of electric power (see the previous description with reference to FIG. 6) and the other for receiving digital information sent by the monitoring device MSA using the technique based on network interruptions (see the previous description with reference to FIGS. 5a, 5b, 5c and 5d).

It should be noticed that one of the most significant functions of the device MSA, among those previously indicated in the opening, is constituted by the item "j", i.e. the generation of diagnostic information relating to the operation of each one of the electric user HA1–HA4, being obtained on the basis of the trends of teh electric quantities measured by MSA; this in consideration of the fact that said function is associated to the very important concept of remote assistance and preventive maintenance for the electric users.

However, this item is also a most critical one, because it presumes the capacity for the monitoring device MSA to detect any failures or malfunctions of the electric user HA in an indirect manner, i.e. only on the basis of the analysis of the values of the power absorptions and/or of other likely electric quantities that can be metered by the meter PM.

Such a critically might only be solved only through a direct dialog between the monitoring device MSA and the electric user HA, presuming however that the latter has an electronic control system and self-diagnose capacity.

However, such a direct dialog cannot be easily obtained with the use of known techniques, since they are too expensive (power line transmission systems) or difficult to practice (direct connection through a specific cable, which involves complexity and costs for the manufacture and installation of the electric users).

Applying, on the contrary, the power modulation transmission techniques covered by the present invention, the problem of a direct dialog between the device MSA and the associated users can be fully and practically solved without additional costs.

In fact, going back to the application example of FIGS. 1 and 3, one or more of the electric users HA1–HA4, if duly prearranged in accordance with FIGS. 6 and 7, can send day by day to the device MSA according to the present invention all information its electronic system is capable of obtaining or generating; to this purpose, the technique of the modulation/demodulation of the absorbed power based on the controlled absorptions of electric power will be used.

Said information may be stored, if necessary, in the memory block MEM of the device MSA: let us think for example of diagnostic information, which can be made available later to the technical people entrusted with the assistance service for the same users (e.g. by means of a remote data elaboration centre, reached by telephone, and picking up the data to be transmitted directly from the household electric network) through the block PLM managed according to the LonTalk® communication protocol.

Analogously, the monitoring device SA according to the present invention can send various information to one or more of the users HA1–HA4, if duly prearranged in accordance with FIGS. 4 and 5, such as information relating to the power absorptions of the electric loads (useful for diagnostic purposes) and other likely information coming from the external environment (through the power line communication system represented in FIG. 2 with the hatched block N);

to this purpose, the technique of modulation/demodulation of the supplied power based on the network interruptions will be used.

By concluding, therefore, the application just described indicates a particularly efficient solution for realizing products capable of generating important information (of energetic, functional, diagnostic and statistical type), for making then said information available to the external environment by means of a suitable communication system.

5.2 Second Example of Use of the Device MSA (Management of Consumption, Technical Servicing and Remote Control)

In FIG. 9 a possible general application of the device MSA according to the present 5 invention is represented.

In said figure a system is schematically represented, consisting of a plurality of household electric users, connected through an appropriate communication network, whose purpose is to rationalize the electric power absorption of said users and avoid exceeding a determined prefixed power limit, which is represented by the value of the contractual power or another limit value being established for convenience by the consumer.

The general structure of the system represented in FIG. 9 is of the type described in EP-A-0 727 668, whose teachings in this connection are herein incorporated by reference.

Accordingly, some household electric users are conveniently pre-set for dynamically self-adjusting their own electric power absorption, constantly adapting it to the global energy requirements of the household environment where they operate, as they may change during the day. In other words such electric users are equipped, according to the invention, with respective "smart" control systems, which have at least the following essential features:

1) Capability of receiving the information concerning the total power absorbed (or, more simply, concerning the total current absorbed) by the household environment, along with the prefixed maximum limit for such an environment, said information being supplied by a suitable metering device fit to that purpose. The exemplification relating to the measurement of current, instead of power, is justified in that the device for limiting the maximum value of power which can be used according to the supply contract is typically a thermal limiter, whose cut-off intervention of the power mains is caused by the heating due to the current flow.
2) Capability of interpreting the information concerning the total power absorption in function of the limit of maximum power which can be supplied as defined in the power supply contract (contractual power), or in function of a convenience limit (such as related to a lower cost of the electric energy) prefixed by the consumer.
3) Capability of constantly managing its own power absorption, coherently with the specific function of the respective electric user and, as far as possible, with the function performed by the other electric users in the home it is able to communicate with.

Point 1) above indicates the need of means suitable for measuring the electric power (or, more simply, the current) absorbed by the household environment and the need of having an adequate communication system between the above measuring device and the electric users properly fitted with a dynamic self-adjustment system of their own power absorption. Points 2) and 3) above indicate the need of fitting the household electric users with a control system which is capable, on the basis of the information transmitted by the power (or current) measuring device, of contributing to maintain the total power (or current) absorption of the whole household environment below a maximum limit (either set forth by the power supply contract or set by the consumer for personal convenience), searching from time to time the best possible compromise between the need of reducing the absorbed power and ensuring anyway an acceptable performance.

To this purpose, in FIG. 9 RE indicates a communication network of the household environment, to which the various household appliances are connected to. In the example, the network RE consists of the same household electric network and the communication system among the various household appliances is of the power line carrier type. This communication system is known and used for information exchange between various interface modules, or communication node N, through the same supply cable of the electric user, i.e. without having to implement a complementary wiring system in the house.

CE indicates a common electric energy meter being associated to the household environment to which the system of FIG. 9 relates. QE indicates the main electric board, which is located directly downstream the meter CE, or anyway at the entry of the household environment; it contains; besides the conventional actuation devices (switches) and safety devices (power limiters, "life savers", etc . . . ), an appropriate device MPE connected to the network through a relevant communication node N.

The device MPE is provided for constantly measuring the value of the total power (or current) absorbed by the household environment and sending on the network RE such a measurement value, along with the value of the maximum limit of usable power (or current).

It should be noticed that the nodes being indicated with N in FIG. 9 are similar to the one previously described with reference to FIGS. 2 and 3.

HA1–HA4 indicate the already mentioned electric users being connected to the monitoring device MSA according to the invention, i.e. a hob with relevant hood, an electric oven, a dishwasher and a refrigerator; let assume that said household appliances are of the built-in type, and therefore being integrated within the pieces of furniture of a sectional kitchen, indicated with CC as a whole. The device MSA is connected to the communication network constituted by RE by means of the respective node N, illustrated in FIG. 2.

LB indicates a laundry washing machine, duly connected in communication network by means of a respective interface module N.

Let assume that the electronic control systems of said laundry washing machine and of said refrigerator HA4 have the capabilities previously cited with reference to EP-A-0 727 668; household appliances of this type will also be indicated, in the following, for the above reasons, as "smart" appliances or users.

Let also assume that the user "hob—hood" HA1, the oven HA2, the dishwasher HA3 are equipped with respective control systems that, even if of the electronic type, do not have the capabilities as indicated above with reference to EP-A-0 727 668, and therefore they are of the "dummy" type, i.e. unable to self-adjust their own power consumption on the basis of the information supplied by the power (or current) measuring device MPE located at the entry of the electric network.

However, such users HA1–HA3 may be turned into active part of the self-adjustment system of power absorptions by means of the device MSA according to the present invention.

To this purpose, the control system of the monitoring device MSA is programmed for "emulating" the capabilities being proper of the control systems of "smart" household appliances; accordingly, the control system of the monitoring device SMA will be able, on the basis of the information transmitted on the network by the measuring device MPE, to contribute to maintain the total power absorption of the whole household environment below the maximum limit, searching from time to time the best possible compromise between the need of reducing the absorbed power through ON/OFF actions on the supply of the relevant electric user which are carried out by means of the normally closed relays RC (FIGS. 2–4), and the need of ensuring anyway an acceptable performance of the electric users.

It will be appreciated that, since the monitoring device SMA according to the invention is able to known the cycle phase in reached by the relevant electric user, the likely ON/OFF action on more than one "dummy" appliance can be decided suitable to limit the inefficiencies due to the interruptions of the mains.

Since the device MPE has to measure the total power (or current) absorbed by the household environment, it refers to the initial non-sectioned length of the electric network RE; through the relevant interface module N, it is able to send directly on the network RE the information containing the value of the total power (or current) absorbed by the household environment and the value of the allowed maximum limit (contractual power or other value established by the consumer for convenience).

The control logic of the meter MPE, based on the use of a microprocessor, performs at least two substantial functions:

the function of measuring the total active power (or more simply of the current) absorbed by all the electric users being present in the same household environment;

the function of sending such information, along with the information relating to the maximum limit of absorbable power (or current), on the same electric network RE through the power lie carrier system and the communication node N;

In general terms, the operation of the system represented in FIG. 9 in connection with the aim of rationalizing the absorption of electric power is as follows.

The electric energy for the household environment is drawn from the external mains system through the energy meter CE. As previously said, the power absorbed by the household environment is limited by an appropriate limiting device (not represented), which limits the power installed according to the power supply contract; in the example, for instance, a maximum limit Pmax of usable power is assumed equal to 3 kWh (contractual power).

The laundry washing machine LB and the monitoring device MSA are electrically supplied through standard current sockets, the device MSA allowing in turn the user HA1–HA4 to be supplied.

The control system of the laundry washing machine LB periodically receives from the measuring device MPE the measured value of the total power PT absorbed by the entire household environment and the prefixed value Pmax of the maximum usable power.

The same information are received by the device MSA, which provides for communication them also to the single associated "smart" user, i.e. the refrigerator HA4 (as above indicated, by way of example) by means of the technique based on the modulation of the supplied power, previously described.

Following the reception of said information, the control system of each active "smart" appliance, i.e. LB and HA4, verifies if the present Value of the total power PT absorbed by the entire household environment is going to exceeded the value of the maximum usable power Pmax.

With reference to the laundry washer LB, if for example the present value of the total power absorbed PT by the household environment, at the moment a certain operation cycle of the same laundry washer is started, would exceeds Pmax, then the control system would immediately reduce the power consumption of the relevant "smart" household appliance LB by a quantity higher or equal to the difference PT-Pmax; subsequently, the control system of the laundry washer LB will update itself to the new value of the total power PT absorbed by the several active users of the household environment, always by exploiting the periodic communication of the measuring device MPE.

On the contrary, if PT is lower or equal to Pmax, then the control system will verify the power absorption status of the relevant "smart" appliance LB in function of a likely change of the laundry washer operation mode.

If, following this control, the "smart" appliance LB results in operating according to normal conditions, i.e. its absorbed power at that time is exactly that as required for its normal operation, the control system of the laundry washer LB will only update its internal memory with the total power absorbed by the household environment; however, without changing its operating procedure.

If, vice-versa, the control system of the laundry washer LB had been previously compelled to reduce the power consumption of the relevant appliance, it may now to decide for an increase in the power absorption, considering, however, that the maximum quantity of additional power cannot overcome the difference Pmax-PT.

Similar considerations can be made with reference to the other "smart" appliance HA4 being connected in the network through the device MSA; obviously, considering that the appliance HA4 is a refrigerator, i.e. An apparatus which must necessarily work with continuity, the actions of "self-adjustment" of the absorbed power will be limited with respect to the case of a laundry washer; in other words, for not exceeding the limit Pmax, the control system of the refrigerator HA4 will be programmed for limiting its absorptions, but always considering the necessity of assuring the good conservation of the food stored therein.

Therefore, the control system of each "smart" household appliance LB and HA4 has the capability of reducing or bring back to normal the absorption of electric power required by the particular phase of the operation cycle being performed by the appliance.

The system of self-adjustment of the power absorbed by each "smart" user may obviously be much more sophisticated than described above by mere way of example, but a further investigation of this aspect is excluded from the purposes of the present invention.

Obviously, the system described above provides priority rules between the various electric users, so as to warrant a dynamic power sharing in function of the type of household appliances being simultaneously active from time to time, and in function of the importance of the role performed by said appliances with respect to the consumer.

In fact, should for example both the oven HA2 and the laundry washer LB be simultaneously active, the latter may automatically decide to give priority to the oven, since food cooling is considered a priority item against washing-up; as a result, the laundry washer would heat the water, for instance, only during the natural rest intervals of the oven heating.

As regards the "dummy" appliances HA1–HA3, they may generally be assigned maximum priority, due to the lack of capacity of the device MSA to perform a refined "dosage" of power absorption, safe the possibility of intervening with ON/OFF procedure—by opening the contact RC of the relay represented in FIGS. 2, 3 and 4—when necessary.

In fact, as previously mentioned, the monitoring device MSA is able to recognize with good approximation the function the associated household electric users are performing; as a result, if the phase of operation being performed by a given "dummy" electric user is not considered a critical one, the monitoring device MSA may decide to interrupt the flow of electric current to the electric user, should it be required in order to avoid exceeding the limit of the contractual power, by opening the respective relay RC under control of the microcontroller M1. When the total power PT absorbed by the household environment is again below the value Pmax, the control system of the device MSA may decide to close the relay RC, so restoring the electric supply to the relevant user.

Moreover, also the fact that the monitoring device MSA is able to generate and send on the network RE information being representative of the function the relevant electric users are performing, allows for further improving the efficiency of the energy management system in the household environment.

Let us assume, for instance, the case in which an air conditioner (not represented) connected to the device MSA and the dishwashing machine HA3 are simultaneously activated; let us also assume that the conditioner has by now determined the achievement of a room temperature close to the selected temperature, while the dishwashing machine is almost at the end of a rinsing phase. In this event, the control system of the device MSA may decide to interrupt temporarily the current absorption of the conditioner (by opening of the respective relay RC), to let the dishwashing machine accomplishing its operating phase; at the end of such a phase, the control system of the device MSA will control the closure of the relay RC, so allowing a new supply to the conditioner.

Concluding, through the managing procedure of the power absorption described above, it becomes possible for a consumer to activate several electric users simultaneously, both of the "smart" type and conventional ones, the latter being however made "smart" by the presence of the device MSA provided by the present invention. In this way, a theoretic global electric power by far higher than the power installed for the individual household environment can be engaged, however, without causing any blackouts or exceeding a prefixed maximum limit of usable power.

Therefore, the monitoring device MSA according to the present invention can be advantageously used also for the rationalization of the power consumption in a household environment.

With farther reference to the description of FIG. 9, RT indicates a telephone line available in the household environment, to which for example a telephone set TE is connected; a telephone node NT is also connected to the line RT, used for the remote transmission of information to a likely Service and Preventive Maintenance Centre for the various electric Users.

The node NT is equipped with proper means for
collecting periodically, through the same electric network RE, information of the functional, diagnostic and statistical type (and eventually also of the energetic type); said information will be generated directly by the "smart" control system of the laundry washer LB and transmitted on the network by means of the respective node N; in the case of the user HA4, said information will be generated directly by the "smart" control system of the refrigerator and transmitted by the same, through the above described transmission system based on controlled absorption of electric power, to the device MSA, which in turn will transmit said information on the network through its own internal node N (FIG. 2); in the case of the household appliances HA1–HA3, the functional, diagnostic and statistical type (and eventually the energetic) information will be generated directly by the device MSA, in the above described manners, which then will transmit said information on the network through its own internal node N of FIG. 2 (as previously described at par. 5.1, diagnostic information could be directly generated by the control system of the appliances HA1–HA3, which then transmits said information to the device MSA using the system based on the controlled absorptions of electric power);

storing said information within proper non-volatile memory means, making said information subsequently available outside, through the telephone line, according to appropriate procedures.

These functions are performed by the device NT through known means, such as a duly programmed microcontroller, fitted with a suitable power line carrier interface module N and electronic memory means, being non-volatile but electrically updatable (such as an EEPROM or FLASH memory).

The control system of the telephone node NT can be programmed for periodically requesting (for example every 10 minutes or other time intervals possibly programmable through convenient external means that may be associated to the same power line communication system), always through the communication line consisting of the electric network RE itself, the new information becoming available from time to time, generated by the control systems of each active "smart" household appliance and control systems of the monitoring device MSA associated to the active "dummy" electric users; said information are collected inside appropriate non-volatile memory means available to the telephone node NT itself.

Therefore, the "data base" associated to the memory means of the telephone node NT is constantly updated and represents the image of the contents of the information being present inside the memory means of each "smart" household appliance and the device MSA.

The contents of said "data base" can be periodically sent, by the telephone node NT, to a Service and Preventive Maintenance Centre for the above purposes. The node NT, in fact, can be programmed for sending periodically (such as every 24 hours or other time intervals possibly programmable through convenient external means that may be associated to the same power line communication system) to a remote Service and Preventive Maintenance Centre, through the conventional switched telephone line and an appropriate conventional analog modem, said "data base" containing all information made available on the electric network RE from the various "smart" appliances and the monitoring device SMA.

Preferably, the node NT also has appropriate input means, such as a keyboard, through which the consumer can activate at his personal discretion the transmission of such a "data base" to said remote Service Centre.

Said Service Centre is provided for servicing and preventive maintenance activity of the various household electric users, said activities being governed for instance by a specific contract signed with the consumer.

The service assistance is based on the diagnostic data sent to the Centre by the consumer through the telephone node NT, whereas the preventive maintenance activity is based—in addition to said diagnostic data—also and above all on the statistical data sent to the Service Centre, always through the telephone node NT.

In this way, the personnel called for repair or maintenance operations to the various electric users has the possibility of having available information relating to the operation status and the "historical" events of the same electric users; according to the present invention, this is made possible, through the monitoring device MSA, also for those electric users HA1–HA3 whose internal control systems are unable to generate such information on their own.

Back to FIG. 9, GSM indicates a telephone node equipped with a cellular modem, of known type, which can manage the transmission and the reception of digital data.

Compared to the node NT previously described, the telephone node GSM uses a modem of GSM or GPRS technology (or UMTS), instead of an analog modem, and uses the wireless communication instead of the communication based on the transmission of signals through a conventional telephone line.

Also the telephone node GSM is connected to the electric network RE through a same interfacing power line carrier module N.

With TC an external mobile telephone of the GSM type is indicated, being capable of digital communication with the telephone node GSM, in particular through alphanumerical messages of the SMS type, which are easier to be managed by the consumer.

In general, the telephone node GSM may be equipped with a control system, and relevant memory means, which allow for performing, besides its specific digital dialog functions with the consumer's GSM mobile telephone, also the same functions of the telephone node NT described above. However, availability of the telephone node GSM, though optional, is particularly advantageous, if paired to a mobile telephone, for example in order to allow the consumer to directly control in a remote way the electric users in the household environment, both for the "smart" appliances and the appliances made "smart" according to the invention through a monitoring device SMA.

Accordingly, in fact, operation of a given electric user can be controlled from a remote position through the mobile telephone TC; additionally, it is also possible to operate a change of such an operation.

The system may be conceived, for instance, so that the consumer can send alphanumerical commands, such as in the form of SMS messages, to the telephone node GSM by means of his personal mobile telephone TC; said messages can be selected from a special menu (for instance a menu being named "home control"). Said command menu for the management of the household electric users can resides within the memory of the mobile telephone, or is a proper SIM card, or being resident on a suitable WAP Server, in accordance with the known WAP technology. Said technological aspects are not, in any case, of primary importance here. Irrespective of the used technology for the management of the control menu of the household environment, the above messages can be formed, by way of example, by only three alphabetic and/or numeric characters, two of which indicating the requested function (e.g. "CS" for indicating Check Status) and the remaining one indicating the user of interest (e.g. 1 for the dishwasher HA3, 2 for the oven HA2, 3 for the laundry washer LB, ect.).

On receipt of said message, the control logic of the telephone node GSM can obtain the requested information by questioning directly, though the communication network RE, the control system of the "smart" user or of the monitoring device MSA associated to the "dummy" user of interest.

After receipt of the requested information, the control logic of the telephone node GSM will inform the consumer, through an appropriate SMS message, sent to the mobile telephone TC.

The telephone node GSM and the mobile telephone TC may also be programmed for allowing the deactivation of a household electric user.

This operation can be performed, for instance, if the answer to a question about the operation status as mentioned above indicates that a certain electric user is active and the consumer wishes to put it off.

In this event, the consumer will send an appropriate SMS message, containing a power-off instruction for the specific electric user, to the telephone node GSM through the mobile telephone TC.

Upon receiving such a message, the control system of the telephone node GSM will transmit, through the network RE, an instruction to the control system of the "smart" appliance of interest, such as the laundry washer LB, and the control system will stop the running operation cycle.

In the event of "dummy" household appliances, vice-versa, the control system of the telephone node GSM will transmit through the network RE an appropriate instruction to the control system of the monitoring device MSA, which will provide for the opening of the relay RC pertaining to the "dummy" electric user of interest, with the consequent power cut-off.

A perfectly similar technique as described above may also be used for activating a household electric user.

Obviously, such an event presumes that the "smart" user of interest (or the user made "smart" by the presence of the device MSA according to the invention), is anyway prearranged for being activated, i.e. with its main supply switch (ON/OFF button) in closed position and its control system, or the control system of the relevant device MSA, is in a stand-by status, waiting for the arrival of the instructions to activate the electric user.

In the specific instance of the device MSA, it will be provided appropriate means to let the consumer to preliminarily bring the contact of each relay RC (which are, as said, one for each of the controlled users) in the opening condition, i.e. a sort of stand-by position. Such means may consist, for example, of a simple control key arranged on the device MSA with an associated warning light, indicating the status of the contact of the relay; said control keys and warning lights will be, obviously, in the same number as the relays and the outlets PC1–PC4 of the device MSA.

Therefore, by means of said key, the consumer is able, before leaving the house, to interrupt upstream the electric supply to the relevant electric user, though the opening of the contact of the relay RC, and then close the ON/OFF switch of the electric user.

Should the consumer wish to activate the electric user of interest from a remote position, it will be enough to send the relevant instruction in the form of an SMS message, by means of the mobile telephone TC to the telephone node GSM.

On receipt of said instruction, the control system of the telephone node GSM will transmit, through the network RE, an instruction to the control system of the monitoring device SMA, which in turn controls the closure of the relay RC of interest; as a result the relevant electric user is supplied with power since its ON/OFF button is already in its closed position.

It should now be pointed out that the possibility of ruse of the devices MSA according to the invention, in connection with a household communication network or "bus" and a telephone node for the transmission of information to a remote location (such as, respectively, the network RE and the node NT and/or the node GSM described with reference to FIG. 9), represents just an advantageous application of the present invention, through which both a diagnostic verification of the functionality and a control in terms of activation/deactivation of the relevant electric users can take place from a location being remote with respect to the household environment.

However, the monitoring device MSA can be also provided for simply generating and storing information locally, for making them accessible to the technical personnel locally. Accordingly, therefore, the device MSA according to the invention might be not fitted with the communication node N, since the retrieval of the required information contained in the memory means MEM could be easily executed by the technical personnel through a personal computer or other appropriate programmable apparatus, connected to the control system of the device MSA through a suitable communication port.

The features of the present invention result in being clear from the above, and are detailed in the annexed claims, which form an integral part of the present description. Also the advantages of the present invention are clear from the above description and the relevant annexed claims.

It is clear that many changes are possible for the man skilled in the art to the monitoring device described above by way of example, without departing from the novelty spirit of the inventive idea.

As previously mentioned, for instance, the transmitter associated to the technique of modulation of the absorbed power can, in general, be based on any electric load of the relevant user, provided it is managed by a triac or similar controlled solid state switch. Therefore, should the load have an excessive power, the control system of the user would be programmed for applying only a minimum portion of the network voltage to such a load.

It is also clear that, should the user control system be capable of detecting a possible malfunction or failure of the transmission stage formed by the system "triac T+electric load L1" (see FIG. 6), the same control system, duly programmed for that purpose, can decide the use of another "triac +electric load" stage for transmitting information to the external environment; this case is shown by way of example in FIG. 6, where L2 and LN indicate in fact further electric loads of the user HA, managed by respective triacs T2 and TN controlled by the microcontroller M2, each one of them perfectly capable of generating controlled power absorptions according to the present invention, in alternative to T1.

As a result, should a malfunction of the "main" transmission stage L1–T1 be detected, the control system of the user HA will be perfectly capable of signalling such a diagnostic problem to the external environment through the technique of the modulation of the absorbed power, using to the purpose one of the "secondary" stages (e.g. L2-T2).

The invention claimed is:

1. System for monitoring at least an electric user, in particular a household appliance, the system comprising a monitoring device being located on an AC electric power supply line between a source of electric energy and said user, said user comprising an electronic control system and at least one electric load, said monitoring device comprising:
   control means,
   metering means for detecting one or more electric quantities,
   memory means,
   means for allowing data to be read from said monitoring device or transmitted out of it,
   said metering means being provided for measuring one or more electric quantities associated with operation of said user;
   said memory means containing reference data or profiles representative of theoretical levels of said electric quantity or quantities that apply to respective operations or phases of operation of said user under the user's normal or correct operating conditions,
   said control means comprising
      means for performing a comparison of the electric quantity or quantities measured through said metering means with said reference data or profiles;
      means for generating, in function of said comparison, information being representative of a current operating status or phase of operation of said electric user,
   communication means being provided, for performing a point-to-point transmission and/or reception of data or information on the electric supply line which connects said user to said monitoring device, by means of a modulation of electric power between said user and said monitoring device and/or vice-versa.

2. System, according to claim 1, characterized in that said electric quantity or quantities is or are selected in a group consisting of:
   electric current absorbed instant by instant by said user,
   mains voltage applied to said user,
   power factor (cos φ) of the electric load represented by said user,
   power absorbed instant by instant by said user,
   electric energy consumed by said user,
   overvoltages and/or brownouts of the mains voltage during a given time interval.

3. System, according to claim 1, characterized in that said control means comprises means for generating, in function of said comparison, information selected in a group consisting of:
   information being representative of efficiency or performance status of said electric user,
   information being useful for estimating wear status of said electric user.

4. System, according to claim 1, characterized in that said control means comprises means for receiving data directly from said user through said communication means, said communication means comprising:
   a transmission stage or transmitter comprised in the electronic control system of said user, which controls a modulation of the electric power absorbed by said electric load;
   a reception stage or receiver of said monitoring device, controlled by said control means for decoding said modulation of the electric power absorbed by said electric load.

5. System, according to claim 4, characterized in that said transmitter of said user comprises means for coding binary information by means of controlled absorptions of electric power or current by said electric load, and said receiver of said monitoring device comprises means for decoding binary information produced by said controlled absorptions.

6. System, according to claim 5, characterized in that said means for coding comprises a solid state switch or relay, such as a triac, associated to said electric load, the enabling signal of said solid state switch or relay being managed by a microcontroller and synchronized with a signal detecting the mains voltage zero crossing.

7. System, according to claim 1, characterized in that said control means comprises means for generating information being representative of energy consumptions by said user, and in particular being representative of distribution of said consumptions in a reference period.

8. System, according to claim 1, characterized in that said control means comprises means for realizing the storage of at least a part of said information within non-volatile read/write memory means.

9. System, according to claim 1, characterized in that said control means comprises interface means for connecting said monitoring device to a communication bus, said control means) comprising means for making at least part of said information available onto said bus and/or for receiving instructions or information through said bus.

10. System, according to claim 9, characterized in that said control means comprises means for transmitting to said user, through said communication means, information and/or instructions received through said bus.

11. System, according to claim 1, characterized in that said metering means comprises an electric power meter and/or a current detector.

12. System, according to claim 1, characterized in that said monitoring device is provided for the connection to a plurality of electric users and comprises a plurality of said metering means, for detecting one or more electric quantities being associated to the operation of each of the users of said plurality, said control means being provided for generating, in function of said comparison, said information being representative of current operating status or phase of operation of each of the users of said plurality.

13. System, according to claim 12, characterized in that said monitoring device comprises a plurality of transmitters.

14. System, according to claim 12, characterized in that said monitoring device comprises a plurality of receivers.

* * * * *